(12) United States Patent
Matsunaga et al.

(10) Patent No.: US 9,098,496 B2
(45) Date of Patent: Aug. 4, 2015

(54) METHOD FOR CREATING MAP DATA AND MAP DATA UTILIZATION APPARATUS

(75) Inventors: Takayuki Matsunaga, Hachioji (JP); Hidetoshi Fujimoto, Makinohara (JP)

(73) Assignee: DENSO CORPORATION, Kariya (JP)

( * ) Notice: Subject to any disclaimer, the term of this patent is extended or adjusted under 35 U.S.C. 154(b) by 479 days.

(21) Appl. No.: 13/014,043

(22) Filed: Jan. 26, 2011

(65) Prior Publication Data

US 2011/0191388 A1 Aug. 4, 2011

(30) Foreign Application Priority Data

Jan. 29, 2010 (JP) ................................. 2010-19094

(51) Int. Cl.
    *G06F 17/30* (2006.01)
(52) U.S. Cl.
    CPC .......... *G06F 17/30* (2013.01); *G06F 17/30241* (2013.01); *G06F 17/30587* (2013.01)
(58) Field of Classification Search
    USPC ........................................................ 707/802
    See application file for complete search history.

(56) References Cited

U.S. PATENT DOCUMENTS

| | | | | |
|---|---|---|---|---|
| 5,543,789 A * | 8/1996 | Behr et al. | | 340/995.12 |
| 7,912,639 B2 | 3/2011 | Atarashi | | |
| 2004/0107037 A1* | 6/2004 | Straub | | 701/93 |
| 2005/0058155 A1 | 3/2005 | Mikuriya et al. | | |
| 2007/0155360 A1* | 7/2007 | An | | 455/403 |
| 2009/0177706 A1 | 7/2009 | Takahata et al. | | |
| 2010/0023554 A1* | 1/2010 | Fujimoto et al. | | 707/104.1 |
| 2010/0094536 A1* | 4/2010 | Lee et al. | | 701/201 |

FOREIGN PATENT DOCUMENTS

| | | |
|---|---|---|
| JP | 05-281904 A | 10/1993 |
| JP | A-2009-258764 | 11/2009 |

OTHER PUBLICATIONS

Office Action dated Aug. 9, 2012, in corresponding CN patent application No. 201110034992.6.
Japanese Industrial Standards Committee, "Road vehicles—Map data physical storage format for car navigation system," JIS D 0810:2004, pp. 92-137 (Mar. 2004) (Discussed on pp. 1 & 2 of the Specification).
H. Fujimoto, "World Wide Vehicle Navigation System Using KIWI Format," *DENSO Technical Review*, vol. 6, No. 1, pp. 29-34 (2001) (English abstract enclosed; discussed on pp. 1 & 2 of the Specification).

(Continued)

*Primary Examiner* — James Trujillo
*Assistant Examiner* — Kurt Mueller
(74) *Attorney, Agent, or Firm* — Posz Law Group, PLLC

(57) ABSTRACT

Map data includes, for each of multiple links used for representing a road in a map, a link record and a speed limit record for a certain link. The link records and the speed limit records of the multiple links for representing a road are collected to form separate data lists of respective attribute types, that is, a link record data list and a speed limit record data list, instead of collecting records by a unit of each link. The map data structured as separate attribute data lists of respective attribute data types for links in the map data, for example, establishes inter-attribute data association between different attribute data types for the certain link based on the arrangement orders of the respective attribute data types in the data list indicative of the same arrangement order of the multiple links.

17 Claims, 19 Drawing Sheets

(56) References Cited

OTHER PUBLICATIONS

S. Kakumoto, "Car Navigation System—Public data structure KIWI and its use," Kyoritsu Publishing, pp. 15, 23, 25, 28, 34, 46, 74, and 76 (Feb. 2003) (partial English translation enclosed; discussed on p. 1 of the Specification).
U.S. Appl. No. 13/013,846, filed Jan. 26, 2011, Nomura et al.
U.S. Appl. No. 13/013,865, filed Jan. 26, 2011, Kutomi et al.
U.S. Appl. No. 13/015,482, filed Jan. 27, 2011, Usui et al.
U.S. Appl. No. 13/014,175, filed Jan. 26, 2011, Tanaka et al.
U.S. Appl. No. 13/013,881, filed Jan. 26, 2011, Watanabe et al.
U.S. Appl. No. 13/013,911, filed Jan. 26, 2011, Matsunaga.
Office Action mailed Aug. 20, 2013 in the corresponding JP application No. 2010-019094 (English translation).
Office action dated Dec. 9, 2013 in the corresponding CN application No. 201110034992.6 (and English translation).
Office Action dated May 17, 2013 issued in corresponding CN patent application No. 201110034992.6 (and English translation).

\* cited by examiner

FIG. 2

(INTEGRATED DATA FILE)

| NO OF LEVEL 0 INTEGRATED MESH DATA A0 |
|---|
| NO OF LEVEL 0 INTEGRATED MESH DATA A1 |
| ... |
| NO OF LEVEL X INTEGRATED MESH DATA A1 |
| OFFSET OF LEVEL 0 INTEGRATED MESH DATA 1 |
| OFFSET OF LEVEL 0 INTEGRATED MESH DATA 2 |
| ... |
| OFFSET OF LEVEL 0 INTEGRATED MESH DATA (A0-1) |
| OFFSET OF LEVEL 0 INTEGRATED MESH DATA A0 |
| OFFSET OF LEVEL 1 INTEGRATED MESH DATA 1 |
| ... |
| OFFSET OF LEVEL 1 INTEGRATED MESH DATA A1 |
| ... |
| OFFSET OF LEVEL X INTEGRATED MESH DATA 1 |
| ... |
| OFFSET OF LEVEL X INTEGRATED MESH DATA AX |
| LEVEL 0 INTEGRATED MESH DATA 1 |
| LEVEL 0 INTEGRATED MESH DATA 2 |
| ... |
| LEVEL 0 INTEGRATED MESH DATA (A0-1) |
| LEVEL 0 INTEGRATED MESH DATA A0 |
| LEVEL 1 INTEGRATED MESH DATA 1 |
| ... |
| LEVEL 1 INTEGRATED MESH DATA A1 |
| ... |
| LEVEL X INTEGRATED MESH DATA 1 |
| ... |
| LEVEL X INTEGRATED MESH DATA AX |

La1, La2, La3

(INTEGRATED MESH DATA)

| INTEGRATED MESH DATA SIZE |
|---|
| NUMBER OF MESHES M |
| OFFSET OF MESH UNIT DATA 1 |
| OFFSET OF MESH UNIT DATA 2 |
| ... |
| OFFSET OF MESH UNIT DATA (M-1) |
| OFFSET OF MESH UNIT DATA M |
| MESH UNIT DATA 1 |
| MESH UNIT DATA 2 |
| ... |
| MESH UNIT DATA (M-1) |
| MESH UNIT DATA M |

LINK RECORD
(FIXED LENGTH)

| LINK TYPE |
|---|
| LINK LENGTH |
| NO OF COORD POINTS (NODE + SHAPE PT) |
| INFO OF OTHER LINKS CONNECTED TO START PT (SEQ NO OF LINKS (SEQ NO OF SUBJECT LINK)) |
| INFO OF OTHER LINKS CONNECTED TO END PT (SEQ NO OF LINKS (SEQ NO OF SUBJECT LINK)) |
| START NODE SIGNAL FLAG |
| END NODE SIGNAL FLAG |
| HIGHER MESH FLAG OF START NODE |
| HIGHER MESH FLAG OF END NODE |
| ADDRESS RANGE INFORMATION FLAG |
| EXT FLAG (SPD LIMIT INFO PRESENCE FL) |
| EXT FLAG (TMC INFO PRESENCE FL) |
| EXT FLAG (GUIDE LANE INFO FL) |
| ... |

FIG. 4B

COORDINATE RECORD
(FIXED LENGTH)

| COORDINATE TYPES (SHAPE INT POINT/ NODE/BOUNDARY) |
|---|
| ADJACENT MESH ID INFO (BOUNDARY NODE ONLY) |
| X COORDINATE |
| Y COORDINATE |
| ... |

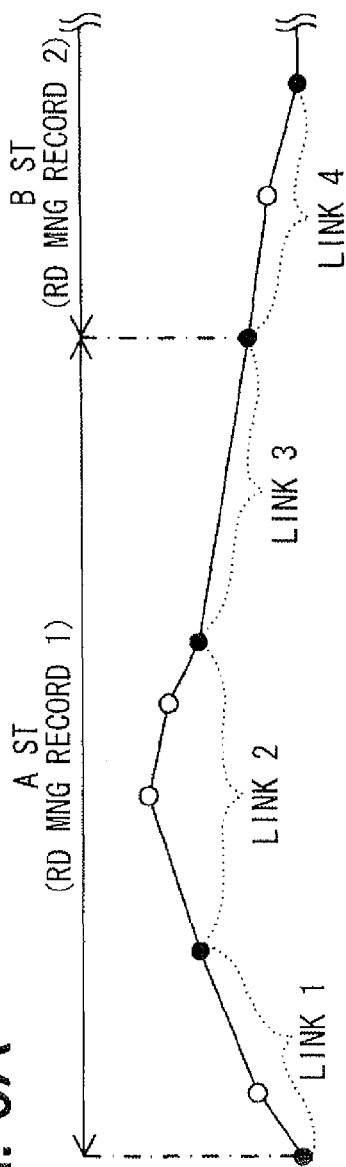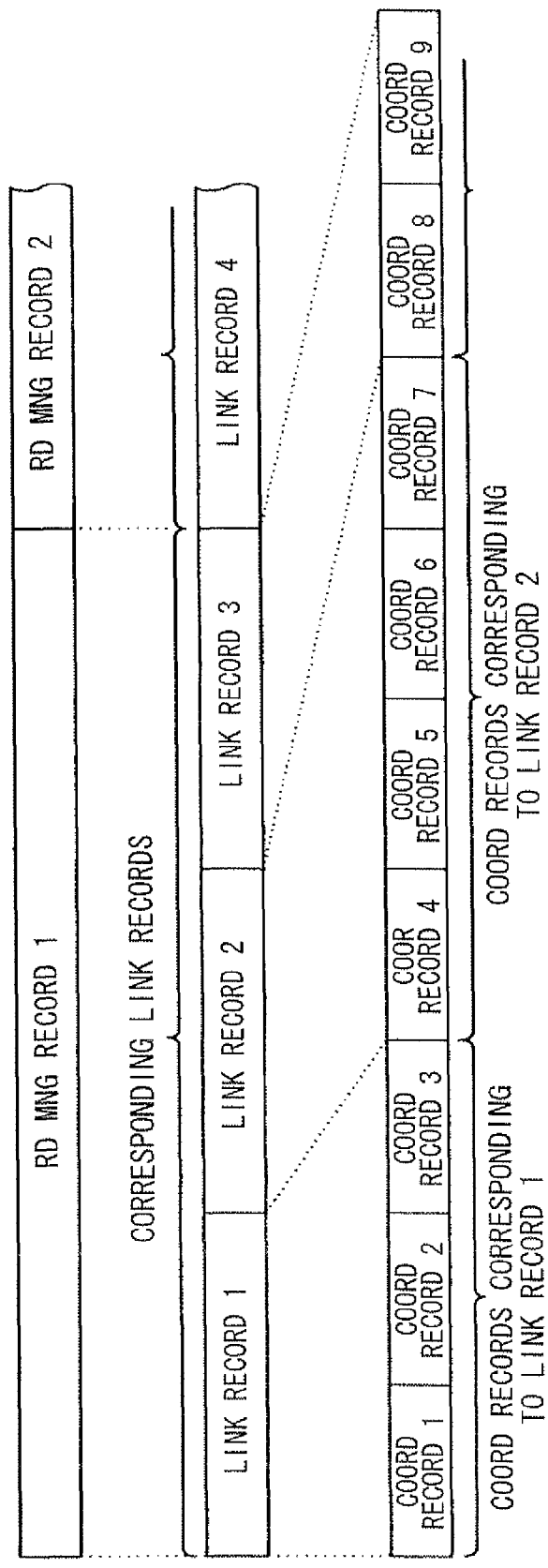

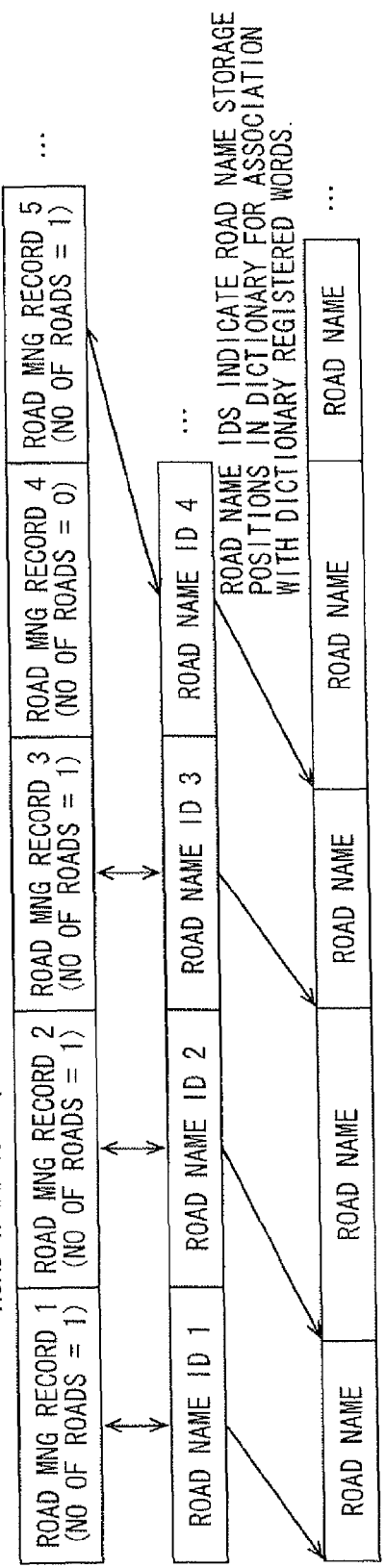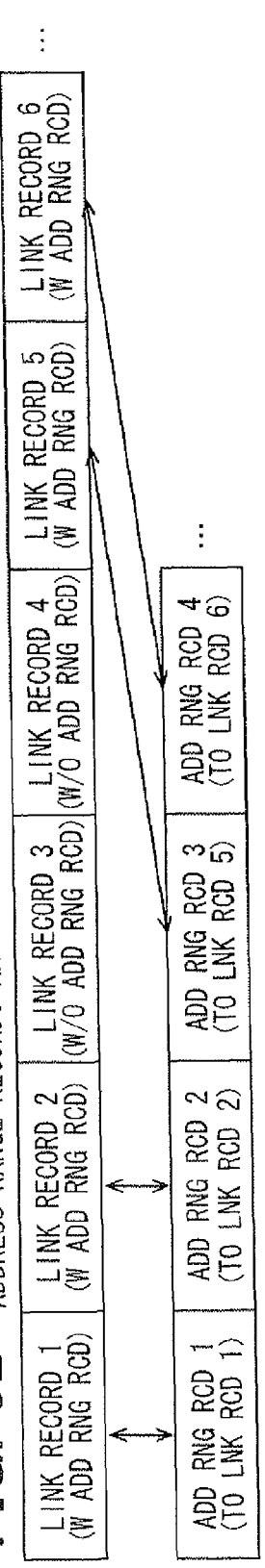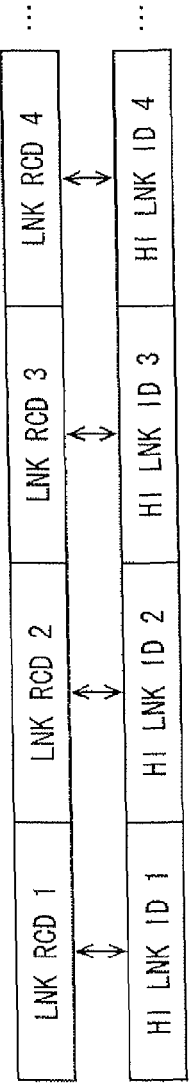

FIG. 13A

```
GUIDE PT MNG RECORD 1       GUIDE PT MNG RECORD 2
(NO OF EXIT LINKS = 3)      (NO OF EXIT LINKS = 2)
```

| EXIT LINK RCD 1 | EXIT LINK RCD 2 | EXIT LINK RCD 3 | EXIT LINK RCD 4 | EXIT LINK RCD 5 |

FIG. 13B

```
LANE MNG RCD 1                    LANE MNG RCD 2
(NO OF FWD LANES = 2)             (NO OF FWD LANES = 1)
 NO OF BKWD LANES = 1)            NO OF BKWD LANES = 2)
```

| LANE ATTR RCD 1 (TO LANE MNG RCD 1) FWD DIR NO 1) | LANE ATTR RCD 2 (TO LANE MNG RCD 1) FWD DIR NO 2) | LANE ATTR RCD 3 (TO LANE MNG RCD 1) BKWD DIR NO 1) | LANE ATTR RCD 4 (TO LANE MNG RCD 2) FWD DIR NO 1) | LANE ATTR RCD 5 (TO LANE MNG RCD 2) BKWD DIR NO 1) | LANE ATTR RCD 6 (TO LANE MNG RCD 2) BKWD DIR NO 2) |

METHOD FOR CREATING MAP DATA AND MAP DATA UTILIZATION APPARATUS

CROSS REFERENCE TO RELATED APPLICATION

The present application is based on and claims the benefit of priority of Japanese Patent Application No. 2010-19094, filed on Jan. 29, 2010, the disclosure of which is incorporated herein by reference.

FIELD OF THE INVENTION

The present invention generally relates to a map data creation method and a map data utilization apparatus.

BACKGROUND INFORMATION

Conventionally, map data formatted for use in a vehicular apparatus is known. Further, map data having a KIWI format is also well-known (Refer to non-patent documents 1 to 3.). The map data format uses links and nodes for representing roads, and attributes (i.e., features) for each of the links, such as link shapes, street addresses and the like, are stored in the map data as attribute data. In the following, a group of attribute data corresponding to one of those links are denoted as a link data. Conventionally, data regarding the links has been stored in the map data.

In addition, in the conventional map data, a unique link ID is assigned to each of those links. The link ID is used for association of link data corresponding to the unique link ID with other data. For example, the link ID is used to represent the connection relationships between two or more links. In the conventional map data, a plural number of link data are combined to form link series data, which includes node data regarding a node that connects two or more links by using link IDs, for ultimately representing connection relationships between two or more links.

Non-patent document 1: "Car navigation system—Public data structure KIWI and its use" by Shigeru Kakumoto, Kyoritsu publishing, February 2003

Non-patent document 2: "Road vehicles—Map data physical storage format for car navigation systems (JIS D 810: 2004)" by Japanese Industrial Standard, March 2004

Non-patent document 3: "Car navigation map data format KIWI" by Hidetoshi Fujimoto, DENSO Technical Review 2001 Vol. 6, No. 1, pp 29-34

In the conventional map data structure, for each of the links, in order to hold the above-described link data that is made by grouping plural kinds of attribute data, a problem of heavy processing and editing load for editing the map data and for editing a map data retrieval program has been caused, when the attribute data of unnecessary kind is deleted from the link data, or when the attribute data of new kind is added to the link data, for the purpose of changing the contents of the map data.

For example, when new data (e.g., attribute data of new kind) is added link data to expand the link data in the conventional map data format, the new data is added to multiple places in the map data in a scattered manner, thereby drastically changing the structure of the map data as a whole. Therefore, in the conventional data format, load for changing the contents of the map data was heavy. If, on the other hand, a redundant map data area is prepared in the map data as a work-around of the above situation, the size of the map data has become unnecessarily large

SUMMARY OF THE INVENTION

In view of the above and other problems, the present disclosure provides a map data creation method and a map data utilization apparatus that enable easy map data updating, expansion and creating as well as providing smaller volume of map data.

In achieving such an advantageous data structure of map data in comparison to a conventional map data structure that associates plural kinds of attribute data to each of the links in the map data, the inventors of the present disclosure invented a map data management method of categorizing map data according to each of the plural attribute kinds of the map data, for enabling easy map data changing scheme. That is, if map data of one kind, i.e., of a certain data type, is structured to be easily changed, it also is easily updated and expanded as a whole.

However, the plural kinds of attribute data of each link have, then, to be associated with each other when the plural kinds of attribute data are categorized and grouped according to each of the plural attribute kinds, instead of being grouped by each of the links, especially when the plural kinds of attribute data are separately stored in different recording medium. If the "inter-attribute" data association is established based on the link IDs, the data volume of the map data is increased. That is, categorizing and managing map data according to attribute kinds is problematic due to the increased data volume for association of attribute data of different kinds.

The map data association scheme of the present disclosure solved this problem by associating the plural kinds of attribute data corresponding to a certain map component in the following manner. In this case, the attribute data association scheme may be applicable not only to links in the map components but also to other map components such as nodes and the like.

In an aspect of the present disclosure, map data for representing a map is created by: when the map is made up from a plurality of map components and each of the plurality of map components has a plurality of attribute types defined in the map data, listing, in a form of a data list, attribute data elements for each of the plurality of attribute types of each of the plurality of map components, and the attribute data elements for representing each of the plurality of attribute types of each of the plurality of map components are formed as one data list. Further, both of the data list of one of the plurality of attribute types and the data list of different one of the plurality of attribute types respectively have an arrangement of the attribute data elements representing a same arrangement order of the plurality of map components in the map data.

According to the above data arrangement scheme, an attribute data element in one attribute data type can be associated with an attribute data element in a different attribute data type, based on the arrangement of attribute data elements in the respective data lists, according to correspondence to an identical map component, for example, thereby allowing identification of a corresponding map component according to an arrangement order of the attribute data element from a top of the data list. In other words, the arrangement order of the plurality of map components is used as "meta" data of the arrangement order of the attribute data elements in the plural types of attribute data.

Therefore, the data volume of the map data is "slimmed" by the amount of link IDs conventionally used for establishing inter-attribute association of the map data.

Further, processes for processing the map data having the above data structure to have an addition/update/deletion of data attribute can be simplified, thereby providing ease for those processes in addition to the reduced data volume.

The map data having such advantageous data structure can be further utilized for creating various versions of map data for specific purposes and/or specific price ranges, as well as for creating new form of map data distribution schemes.

As a variation of the above data structure, the attribute data elements in the respective data lists may represent a completely same arrangement order of the map components, and may also represent a partially same arrangement order of the map components, depending on the requirement of the map data. In other words, attribute data elements corresponding to a part of the map components are omitted from some of the data lists of the attribute data in some cases. That is, if the original attribute data arrangement is re-constructed, the completely same arrangement order of the map components can be represented by both of the respective data lists.

Further, as a different variation of the above data structure, a plurality of attribute data elements of one attribute kind may be prepared for one map component. In such a case, the number of data elements may be stored in the data list, and a group of the plurality of attribute data elements are considered as one attribute data element.

If the data map data is created by partially omitting the attribute data elements that correspond to a part of the plural map components, the following method is used to create the map data. That is, the data list is categorized either as a main data list or an extended data list, and the extended data list that is dependent on the main data list is capable of omitting the attribute data elements corresponding to the part of the plural map components in the following manner.

In the extended data list, attribute data elements of the part of the plural map components are omitted from the data list, thereby resulting in the arrangement of the attribute data elements in the extended data list lacks the part of the plural map components supposed to exist in the main data list. This is an extended data list formulation method. Then, in the main data list, each of the plural map components is listed as the attribute data elements, with a flag indicative of lack of the extended attribute data in the corresponding extended data list. This is a main data list formulation method. The flag in the main data list may be provided in various forms of information, such as the number of corresponding elements, and the like. Further, the flag is "embedded" as a part of main attribute data elements.

In this manner, each of the attribute data elements in different attribute data type is associated with a single map component, without having an attribute for attribute data association. In other words, no useless attribute data is created in the map components, thereby structuring map data in an efficient manner.

Further, map components in the map data may be represented either by basic attributes that are required in the map data, or as extended attribute that are not necessarily required in the map data.

The basic attributes in the map data are thus formulated as a basic data list for each of the map components, and the extended attributes in the map data are formulated as an extended data list for some of the map components, as required. Therefore, by preparing a number of extended data lists, map data in various different versions can be easily created, and the map data can be easily adapted to different vehicle models and/or different sales channels of the map data, in various price ranges.

The ease of creation of various extended data lists is achieved by omitting different data attribute corresponding to a certain map component, and the omitted data attribute is indicated by a flag or information embedded in the basic data list.

Further, the attribute data used in a map data utilization apparatus belonging to each of the plurality of map components has a plurality of attributes represented by respectively different attribute data types, and each of the different types of attribute data is formulated as a data list, and arrangement of the data list for each of the different types of attribute data for each of the plurality of map components has a same arrangement order. The map data in the apparatus has same advantages as described in the creating method of the map data in the above.

Further, a group of data lists for each of different types of attribute data includes a main data list and an extended data list that belongs to the main data list, and arrangement of attribute data in the extended data list indicates lack of attribute data corresponding to a part of the plurality of map components whose attribute data are arranged in the main data list, and the main data list formed as arrangement of attribute data of the plurality of map components of the map has embedded information of the lack of attribute data in the arrangement of attribute data in the extended data list. The same advantages are expected as the map data in the above map data creating method.

Furthermore, the map components in the above data structure may include a link for representing a road in the map, and the data list is considered as the arrangement of the attribute data elements. In addition, the series of links corresponding to a single street in the map may be considered as a single map component based on the above map data structure. The background image data in the map and/or the three-dimensional polygons may also be advantageously managed as the map components based on the map data structure of the present disclosure.

BRIEF DESCRIPTION OF THE DRAWINGS

Objects, features, and advantages of the present disclosure will become more apparent from the following detailed description made with reference to the accompanying drawings, in which:

FIG. 2 is a configuration illustration of an integrated file having basic data and extended data in the embodiment;

FIGS. 4A and 4B are configuration illustrations of a link record and a coordinate record of the road data in the embodiment;

FIGS. 5A and 5B are illustrations of arrangement of a road management record, the link record and the coordinate record of the road data as well as association therebetween in the road data in the embodiment;

FIGS. 6A, 6B, 6C are illustrations of arrangement and association of the road management record and a road name ID, arrangement and association of the link record and an address range record, and arrangement and association of the link record and a higher link ID in the embodiment;

FIGS. 13A and 13B are illustrations of arrangement and association of a guidance point management record and an exit link record, and illustrations of arrangement and association of a lane management record and a lane attribute record in the guidance/lane data in the embodiment;

DETAILED DESCRIPTION

Figure 1:
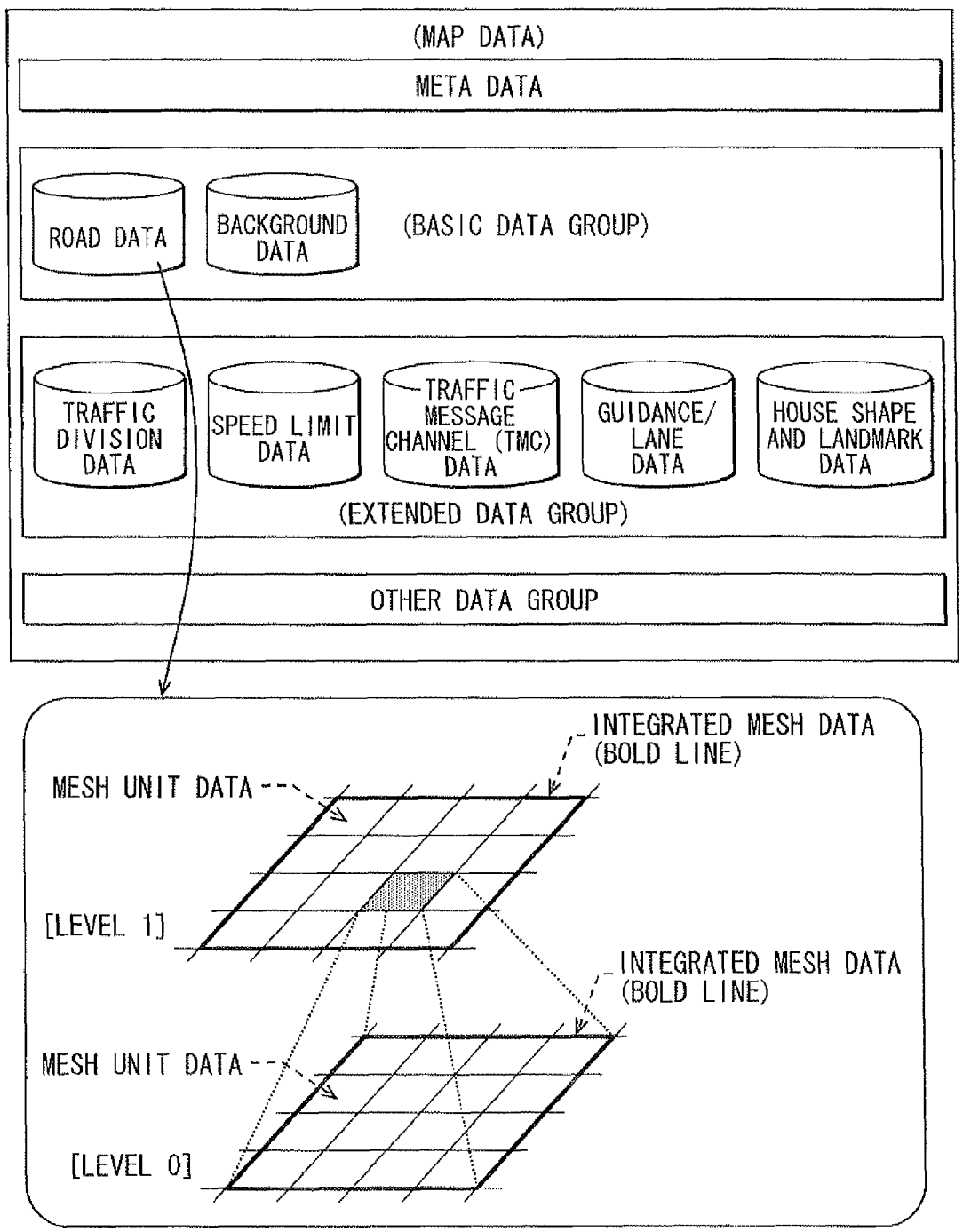
FIG. 1 is a block diagram and an illustration of map data used in an embodiment of the present invention.

An embodiment of the present invention is explained in the following with reference to the drawing.

(1. Structure of Map Data)

Map data according to the present embodiment is loaded and used in a navigation device mounted on a vehicle. As shown in FIG. 1, the map data includes meta data, a basic data group, an extended data group and other data groups.

The meta data represents important control information about the structure of the map data. The basic data group represents basic information of a map among variety of (i.e., indispensable) data groups. The basic data group includes road data regarding the information of roads and background data regarding the information of a background of a two-dimensional map.

The extended data is added to the map data as required. According to the map data structure of the present embodiment, map data of multiple types can be created by including various types of data in the extended data group of the map data. The extended data group includes, for example, traffic division data, speed limit data, traffic message channel (TMC) data, guidance/lane data, house shape and landmark data and the like.

The other data groups includes an image data group used for displaying the map, an icon data group and the like.

The basic data in the basic data group and the extended data in the extended data group are respectively divided into multiple mesh units of data groups, which are obtained as subdivisions of a whole area of the map in the map data, as shown in FIG. 1. The divided mesh units of data groups are, by definition, grouped as integrated mesh data of the basic data and of the extended data. In this case, the integrated mesh data does not necessarily combine the mesh units of an entire map publication area, but simply combines multiple pieces of mesh units of data groups. In other words, the entire map publication area includes multiple pieces of the integrated mesh data.

More specifically, the basic data and the extended data are structured into multiple layers, that is, have multiple hierarchies according to the degree of minuteness of the map. That is, each of the basic data and the extended data is structured as an integrated data file that combines integrated mesh data in each of those multiple layers for the coverage of the entire map publication area, as shown in FIG. 2.

The lower half of FIG. 1 shows a data mesh unit in a lowest layer defined as "level 0" and a data mesh unit defined as "level 1" in an above layer which is above from the lowest layer by one layer. A single data mesh unit in the level 1 layer is divided into a predetermined number of mesh units, in this case, 16 data mesh units in the level 0 layer, as illustrated. In the following description, the term "layer" may be substituted by the term "level."

The map publication area in one data mesh unit thus increases, for both of the basic data and the extended data, as the level number increases. The map information retained in one data mesh unit becomes "coarse" in a higher level. The map data in the mesh unit in the higher level are used for searching for a long distance route and for displaying a wide area map.

(1.1 Structure of an Integrated Data File)

As described above, each of the basic data and the extended data (road data and background data as "basic data," and traffic division data, speed limit data, traffic message channel (TMC) data, guidance/lane data, house shape and landmark data and the like as "extended data") is structured as the integrated data file by combining the integrated mesh data in each of the data levels. The concrete examples of the integrated data file are illustrated in FIG. 2.

Specifically, the integrated data file includes an integrated mesh data number list La1 for providing the mesh data number in each level, an integrated mesh data offset list La2 for providing an offset of the integrated mesh data in each level, and an integrated mesh data list La3 for providing an integrated mesh data in each level. Here, the numbers A0 to AX of the integrated mesh data show the number of integrated mesh data in a certain level. The numbers A0 to AX is defined by a fixed data length. In FIG. 2, the level number is assumed to be X+1 (X is an integer of 0 or more).

The offset of the integrated mesh data shows an offset to the corresponding integrated mesh data. Specifically, the offset of the integrated mesh data shows a value defined by a byte position from a reference position, at which the corresponding integrated mesh data is stored. The offset of the integrated mesh data is defined by the fixed data length. The reference position may be a beginning position of an area in which the offset is written, a beginning position of the integrated mesh offset list La2, a beginning position of the integrated mesh data list La3, or the like. When there is no corresponding integrated mesh data, the offset of the integrated mesh data is defined as a null value, i.e., "0xFFFFFFFF."

The integrated mesh data includes a mesh unit data offset list La4 and a mesh unit data list La5. The mesh unit data offset list La4 includes information of an integrated mesh data size, the number M of meshes, and offsets 1 to M of the mesh unit data. The mesh unit data list La5 includes information of mesh unit data 1 to M. The integrated mesh data size shows a total size of the integrated mesh data. The integrated mesh data size is defined by a fixed data length. The mesh number M shows the number of meshes in a map publication area corresponding to the integrated mesh data. The mesh number M is also defined by a fixed data length.

The mesh unit data offset shows an offset of the corresponding mesh unit data. Specifically, the offset is a value defined by the byte position, at which the corresponding mesh unit data is stored, from the reference position. The offset is defined by the fixed data length. Here, the reference position is, for example, a beginning position of an area in which the offset is written, a beginning position of the mesh unit data offset list La4, or a beginning position of the mesh unit data list La5. When there is no corresponding integrated mesh data, the offset of the mesh unit data is defined as a null value, i.e., "0xFFFFFFFF."

The mesh unit data 1 to M includes information, which provides "core" information of the basic data and the extended data. The mesh unit data 1 to M is described in a format corresponding to the type of the basic data and the extended data. In the following, as well as the structure of the Data format of the mesh unit data, i.e., the road data and the background data serving as the basic data, and the traffic division data, the speed limit data, the traffic message channel (TMC) data, the guidance/lane data serving as the extended data, is respectively explained in detail. In this case, the explanation of the house shape and landmark data is omitted due to the basic similarity of the data format. The house shape and landmark data is data for representing association between polygons for drawing a three-dimensional map image and the coordinates. The background data is, on the other hand, data for representing association between the background for drawing a two-dimensional map image and the coordinates.

(1. 2 Mesh Unit Data of the Road Data)

Figure 3:
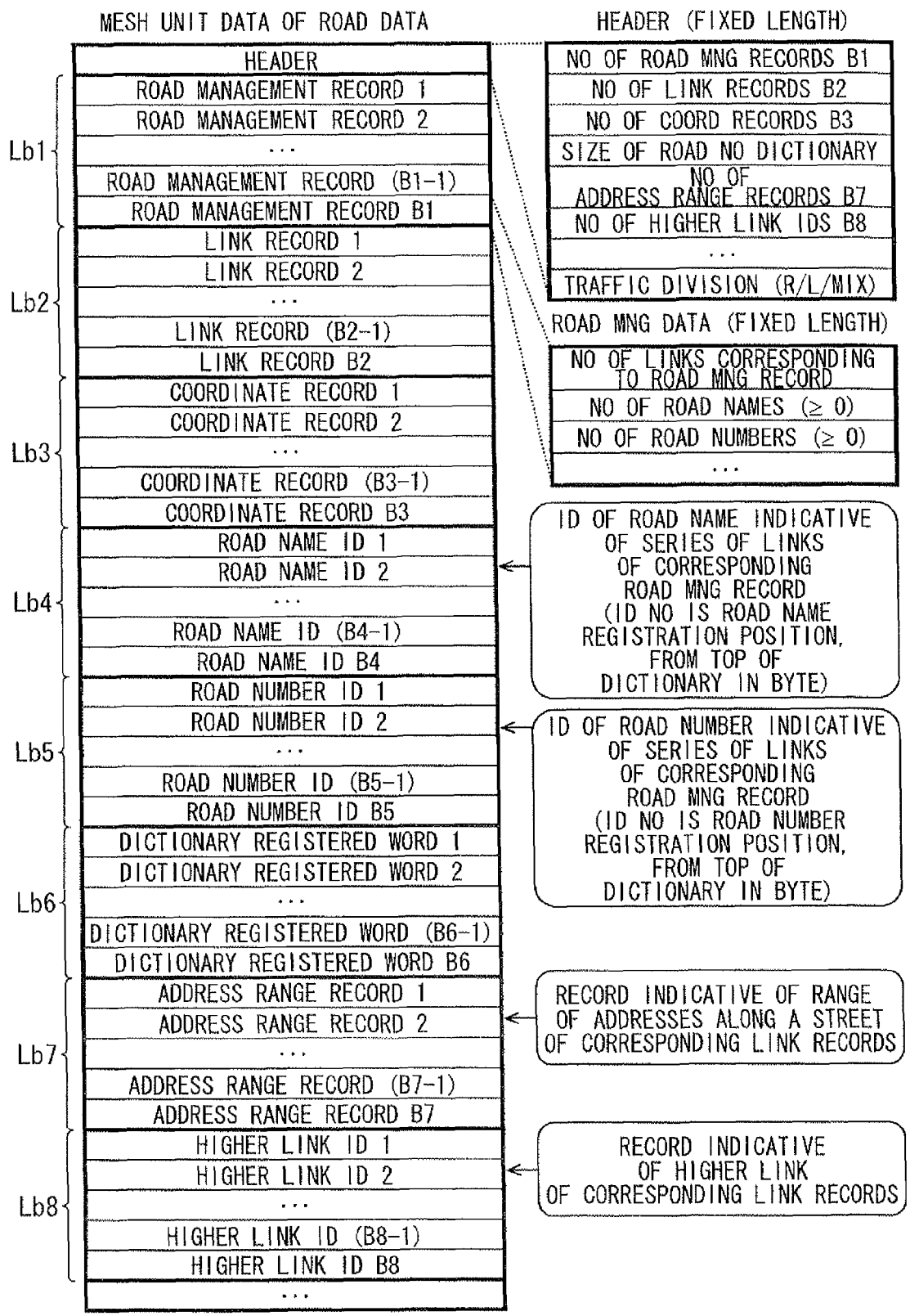
FIG. 3 is a configuration illustration of road data for each mesh in the embodiment.

As described above, the road data includes information of a road. As shown in FIG. 3, the mesh unit data of the road data includes a road management list Lb1, a link list Lb2, a coordinate list Lb3, a road name ID list Lb4 and a road number ID list Lb5, a road number dictionary Lb6, an address range list Lb7, a higher link ID list Lb8, and the like. The data structure illustrated in FIG. 3 is hereinafter referred to as "Mesh Unit Data of Road Data". The road management list Lb1 includes information of a header and a group of road management records 1 to B1. The link list Lb2 includes a group of link records 1 to B2. The coordinate list Lb3 includes a group of coordinate records 1 to B3. The road name ID list Lb4 includes a group of road name IDs 1 to B4. The road number ID list Lb5 includes a group of road number IDs 1 to B5. The road number dictionary Lb6 includes a group of registered words 1 to B6 regarding road names and road number names. The address range list Lb7 includes a group of address range records 1 to B7. The higher link ID list Lb8 includes higher link IDs 1 to B8.

(1. 2. 1 Header)

The header stored in the mesh unit data of the road data is defined by the fixed data length. The header includes information such as the road data management records number B1, the link records number B2, the coordinate records number B3, the road number dictionary size, the address range records number B7, the higher link IDs number B8, traffic division and the like. The information on the traffic division indicates the map publication area of a certain mesh unit data implements a right side traffic, a left side traffic, or a mixed traffic having both of right side traffic roads and left side traffic roads. In European Union areas, for example, there are mixed traffic areas. The map data provided for areas having such kinds of traffic regulations includes header data indicating the mixed traffic and the extended data having the traffic division information (see FIGS. 1 and 9). The map data provided for the other areas includes header data indicating either of the right side traffic or the left side traffic and the extended data having no traffic division information.

(1. 2. 2 Road Management Record)

The road management record is defined by the fixed data length in each record. The road management record includes information of the number of links, the number of road names, the number of road numbers and the like. The road management record manages a series of links that constitute a "street," for example. In other words, multiple series of links forming an A street, a B street, . . . , are grouped as the road data of the road management records in the mesh unit data. The road data in one data mesh unit stores the road management records of each of the grouped link series.

The number of the links represents the number of links constituting a link series managed by the road management record, and the number of road names represents the number of road (street) names designating each link series registered in the road data. If no road (street) name is registered to a certain link series in a course of generating the map data, the number of road names has the value of 0 (zero).

Then, the number of road numbers represents the number of road numbers designating each link series registered in the road data. If no road number is registered to a certain link series in a course of generating the map data, the number of road numbers has the value of 0 (zero). The number of road names and the number of road numbers are used to read a road name and a road number of the link series from the road number dictionary Lb6.

(1. 2. 3 Link Record)

The link record is defined by the fixed data length. The link record provides information regarding a link in each record. The link record corresponding to each link in the mesh is stored in the mesh unit data of the road data.

FIG. 4A shows the structure of the link record. As illustrated, the information about the type of a link, a length of the link, and the number of coordinate points between the start point and the end point of the link.

In the map data, both ends of the link have a node illustrated as a black circle in FIG. 5A. Multiple shape interpolation points are arranged between the two nodes. The shape interpolation point is shown as a white circle in FIG. 5B. The shape interpolation point is used for representing a shape of the link, which may be curved between both ends of the link. Coordinates of each shape interpolation point are stored in a coordinate record to be described later. The number of the coordinate points in one link record is a total number of the nodes and the shape interpolation points in that link.

Further, the link record stores information of other links connected to a subject link, that is, information regarding other links connected to the start point of the subject link or the end point of the subject link. The map data in the present embodiment, no absolute link ID is assigned to each of the links as the conventional map data. Therefore, information of other links is represented by sequence numbers 1 to B2 in the link records of the link list Lb2. That is, for example, if a link record 2 is connected to the start point of the link, a sequence number 2 is written as the information of other links connected to the start point of the link. If no other link in the same mesh is connected to the start/end point of the link, the sequence number of the subject link is written as the information.

A situation "no other link in the same mesh" is described as a dead-end, a start/end point of the link is a node on a boundary (i.e., a boundary node described later) of the meshes with connected links belonging only to the next mesh, or the like. In the present embodiment, the mesh data is a "closed" data, link connection relationships are recorded for the links inside of the mesh boundary, and no inter-mesh link relationship is recorded.

Then, in the link record, there are flags such as a start node signal flag representing whether or not a traffic signal exists on the start node, an end node signal flag representing whether or not a traffic signal exists on the end node, and a higher mesh flag representing whether or not a node corresponding to a start/end node of the link exists in a higher mesh unit data.

Further, in the link record, there are flags such as an address range information flag representing whether or not an address range record corresponding to the subject link exists in the address range list Lb7, a speed limit information presence flag representing whether or not a speed limit management record (FIG. 10) corresponding to the subject link exists in the speed limit data that serves as the extended data. Further, there are flags such as a TMC management information presence flag representing whether or not a TMC management record (FIG. 11) corresponding to the subject link exists in the TMC data that serves as the extended data, and a guidance/lane information flag representing whether or not a guidance point management record and a lane management record (FIG. 12) corresponding to the subject link exist in the guidance/lane data that serves as the extended data.

(1. 2. 4 Coordinate Record)

In the mesh unit data of the road data, the coordinate list Lb3 including the coordinate records 1 to B3 is a list of coordinates (i.e., longitude and latitude) of the nodes and the shape interpolation points in each of the links that are registered in the link list Lb2. That is, in other words, each of the coordinate records 1 to B3 represents the coordinates of a corresponding node or a corresponding shape interpolation point.

FIG. 4B shows the structure of the coordinate record. The coordinate record is defined by the fixed data length. The coordinate record includes information about the type of coordinates, the X coordinate as the coordinate of the longitude degree, and the Y coordinate as the coordinate of the latitude degree. The type of coordinates indicates whether the subject point is a boundary node, a non-boundary node, a dummy node, or a shape interpolation point.

Then, the coordinate record stores identification information of the adjacent mesh, to which the boundary node is connected. The identification information has a valid value only when the type of the coordinates in the coordinate record indicates that the subject point is the "boundary node." When the type of the coordinates indicates that the subject point is the non-boundary node, the identification information has a void value. The coordinate record further includes "identification information of the adjacent mesh connecting to the boundary node," which contains information of whether the boundary node exists on one of four sides or on one of four corners of the mesh in the mesh unit data. The mesh, in this case, is assumed to have a rectangular shape, as shown in FIG. 1.

(1. 2. 5 Data Arrangement)

The arrangement of the road data management record 1 to B1 in the road data management list Lb1, the arrangement of the link records 1 to B2 in the link list Lb2, and the arrangement of the coordinate records 1 to B3 in the coordinate list Lb3 are described with reference to FIGS. 5A and 5B.

The road management record is used for managing the link series. The link record includes the attribute information of the link. The coordinate record includes coordinate information of each point (i.e., each of the nodes and the shape interpolation points), which is set in the link. Thus, the coordinate record relates to the link record, and the link record relates to the road management record.

In the present embodiment, record association among the road management list Lb1, the link list Lb2 and the coordinate list Lb3 is performed by aligning the arrangement order in the list. FIG. 5B shows a relationship among the road management list Lb1, the link list Lb2 and the coordinate list Lb3, which represents the map shown in FIG. 5A that includes the streets, the links, the nodes and the shape interpolation points.

Each of the road management records registered in the road management list Lb1 is considered as attribute data of the first attribute (feature) of a street (a link series), and the group of link records corresponding to the link series are considered as attribute data of the second attribute of that street. In the present embodiment, as shown in FIG. 5B, the group of link records corresponding to the road management record 1, having the sequence number 1 in the road management list Lb1, are arranged at a top of the link list Lb2. The group of link records of the link series corresponding to the road management record 2 having the sequence number 2 in the road management list Lb1 are arranged subsequent to the group of link records of the link series corresponding to the road management record 1 having the sequence number 1 in the road management list Lb1. In this manner, the link list Lb2 and the road management list Lb1 have the same arrangement order of the link records for a specific street (link series) in order to associate multiple attributes of that street.

In the present embodiment, the arrangement of the streets corresponding to the road management records 1 to B1 in the road management list Lb1 and the arrangement of the streets corresponding to the link records 1 to B2 in the link list Lb2 are aligned, i.e., equalized to have the same order. Thus, each of the records in the road management list Lb1 and each of the records in the link list Lb2 are associated with each other in a retrievable manner.

Then, the road management record stores the information of the number of links. Thus, even when multiple link records are associated with only one road management record, the top of the road management list Lb1 and the top of the link list Lb2 are read out and referred to so that the relationship between the road management records 1 to 131 and the link records 1 to B2 is specified and established.

The link record registered in the link list Lb2 is considered as attribute data of the first attribute of the link, i.e., the feature of the road link, and the group of the coordinate records corresponding to this link is considered as attribute data of the second attribute of this link. In the present embodiment, as shown in FIG. 5B, the group of coordinate records of the points set in the link corresponding to the link record 1 having the sequence number 1 in the link list Lb2 are arranged from a tip of the coordinate list Lb3, and the group of coordinate records of the points set in the link corresponding to the link record 2 having the sequence number 2 in the link list Lb2 are arranged subsequent to the group of coordinate records corresponding to the link record 1 in the link list Lb2. In this manner, the link list Lb2 and the coordinate list Lb3 are generated to have the same arrangement order of the links between the link list Lb2 and the coordinate list Lb3.

In other words, the arrangement of the links corresponding to the coordinate records 1 to B3 in the coordinate list lb3 is aligned to have the same order as the link list Lb2 in the present embodiment. Thus, the link list Lb2 and the coordinate list Lb3 are associated with each other. Here, since the link record stores the information of the number of coordinate points, even when multiple coordinate records are associated with only one link record, the relationship between the link records 1 to B2 and the coordinate records 1 to B3 is specified by referring to and reading out from the top of the link list Lb2 and the top of the coordinate list Lb3. In this case, the group of coordinate records corresponding to the only one link record is arranged in the coordinate list Lb3 in an order from a starting point to an ending point of the link. Since the coordinate record of the ending point of the link shows the same coordinates as the coordinate record of the starting point of the next link, the registration of the coordinate record can be skipped.

(1. 2. 6 Road Name ID)

The road name IDs are used to read the road name (a street name) corresponding to the link series in the road management record from the dictionary, and are represented by an offset (a byte position) from a top position of the road number dictionary Lb6. The road name ID is defined by the fixed data length. The map data in the present embodiment utilizes road names (street names) read from the road number dictionary Lb6 based on the road name ID.

The arrangement of road name IDs 1 to B4 in FIG. 3 are aligned with, in the road name ID list Lb4, the arrangement of the road management records 1 to B1 in the road management list La1. In other words, the road name IDs 1 to B4 are arranged according to the road management records of a certain "street." FIG. 6A illustrates a relationship between the arrangement of the road management records 1 to B1 in the road management list Lb1 and the arrangement of the road name IDs 1 to B4 in the road name ID list Lb4.

The road management record has three association types, that is, a no road name ID association case, in which the number of road names indicated in the road management record is zero, a one name association case, in which the number of road names indicated in the road management record is one, and (c) a two or more names association case, in which the number of road names indicated in the road management record is two or more. Basically, in either of the three cases described above, the road name IDs of the subject street are arranged in the road name ID list Lb4 according to the road management records 1 to B1, in the same manner as the association between the road management list Lb1 and the link list Lb2, or as the association between the road link list Lb2 and the coordinate list Lb3, for the purpose of establishing association between the road management records 1 to B1 and the road name IDs 1 to B4.

More practically, in the road name ID list Lb4, the road name IDs are arranged so that the road name IDs corresponding to smaller sequence numbers of the road management records in the road management list Lb1 come to a top of the list. In this case, when there is no road name ID corresponding to a certain road management record, a space for that road name ID corresponding to a certain road management record is occupied by the road name ID corresponding to a subsequent road management record. That is, a vacant position of the road name ID is filled with the next road name ID.

For example, in the case of FIG. 6A, though there is no road name ID associated with the road management record 4 having a sequence number 4, the road name ID corresponding to the road management record 5 having a sequence number 5 is arranged after the road name ID corresponding to the road management record 3 having a sequence number 3 in the road name ID list Lb4.

With reference to the road management records, it is easily understood that there is no road name ID corresponding to the road management record 4 having the sequence number 4, the relationship between the road management records 1 to B1 and the road name IDs 1 to B4 can be specified by sequentially referring to and reading the road management list Lb1 and the road name ID list Lb4 from a top of those lists.

In the above example, the road management record is considered as first attribute data of a street, and the road name ID is considered as second attribute data of the street. Therefore, the first and second attribute are associated with each other in the above-described manner.

By the way, reading the road names from the dictionary by way of the road name IDs is intended to simplify and facilitate reading based on the lists of those attributes formulated as much as possible by using the fixed data length. That is, when the data length is fixed, data can be read out from the list at a fixed byte interval in a simple manner.

(1. 2. 7 Road Number ID)

The road number ID is used to read a road number of a street that corresponds to the road management record, and is represented as an "offset" (a byte position) from a start position of the road number dictionary Lb6. The road number ID has a fixed data length. The map data in the present embodiment is read from the dictionary Lb6 according to the road number ID. In this case, road numbers and road names are "equal" in the dictionary Lb6, in terms of registered words.

The road number name IDs are arranged in the road number ID list Lb5 according to the arrangement of the road management records 1 to B1 in the road management list Lb1. The road number ID list Lb5 is generated substantially in the same manner as the road name ID list Lb4. Therefore, the explanation of the arrangement of the road number ID list Lb5 is omitted.

(1. 2. 8 Road Number Dictionary)

The road number dictionary Lb6 is formed as a group of registered road numbers (registered words) 1 to B6 having variable data length. The registered road numbers (registered words) are formed as text strings representing road names (i.e., street names) and road numbers.

(1. 2. 9 Address Range Record)

The address range record represents a range of addresses between both ends of a certain link (e.g., a street). The map data in the present embodiment assumes a data format used in North America. In North America, the "address" of houses are arranged along a street, and the address range is thus defined as the house number of both ends of a certain street. The address range record has a fixed data length.

Then, each of the address range records is correspondent to only one link, and is registered to the address range list Lb7. More practically, the address range list Lb7 has address range records 1 to B7 respectively representing links that are registered in the link list Lb2, arranged in the same arrangement order of the records in the link list Lb2.

However, the links registered in the link list Lb2 does not necessarily have a corresponding record registered in the address range list Lb7. In other words, while the address range records in the list Lb7 are generally arranged in association with the link records in the list Lb2, which are arranged from younger sequence numbers to older sequence numbers, a position in the address range list Lb7 is occupied by an address range record of the next link record in the link list Lb2, when an address range record corresponding to a certain link record in the link list Lb2 is not registered in the address range list Lb7. That is, when a certain corresponding relationship is "skipped," the next record fills the skipped position.

FIG. 6B illustrates a relationship between the arrangement of the link records 1 to B2 in the link list Lb2 and the arrangement of the address range records 1 to B7 in the address range list Lb7. In the example shown in FIG. 6B, address range records corresponding to a link record 3 having a sequence number 3 and a link record 4 having a sequence number of 4 are not registered in the address range list Lb7. Therefore, the arrangement order of the address range records in the address range list Lb7 shows a sequence of address range records, respectively corresponding to a link record 1 having a sequence number 1, a link record 2 having a sequence number 2, a link record 5 having a sequence number 5, and a link record 6 having a sequence number 6.

The relationship between the link records 1 to B2 and the address range records 1 to B7 is grasped by reading the address range records 1 to B7 from the top of the list Lb7, because each of the link records having no corresponding address range record registered in the list Lb7 has an address range information flag indicative of "no info." In other words, with reference to the address range information flag in the link records, the association between the link records and the address range records is correctly established.

In this example, the link records are considered as the first attribute of a link, and the address range records are considered as the second attribute of a link. Therefore, the association between the multiple attributes of a certain link is proven to be established in the above-described manner.

(1. 2. 10 Higher Link ID)

The higher link IDs are used to represent sequence numbers of higher level links corresponding to a subject link. The higher link ID has a fixed data length. The sequence number in this context means a sequence number from a top of the link list Lb2 of a mesh unit data in the higher level. The higher link IDs are used to associate the links in a certain level with the links in a higher level.

More practically, each of the higher link IDs has a one-to-one correspondence to each of the links in a level of the mesh unit data, to be stored in the higher link ID list Lb8. FIG. 6C illustrates the relationship between the arrangement of the link records 1 to B2 in the link list Lb2 and the arrangement of the higher link IDs 1 to B8 in the higher link ID list Lb8.

As shown in FIG. 6C, for each of the links registered in the link list Lb2, the higher link IDs 1 to B8 in the list Lb8 are arranged in the same arrangement order as the links in the list Lb2. By assigning the same arrangement order to both of two arrangements, the higher link IDs 1 to B8 in the higher link ID list Lb8 are associated with the link records 1 to B2 in the link list Lb2.

(1. 3 Background Data in Mesh Unit Data)

Figure 7:
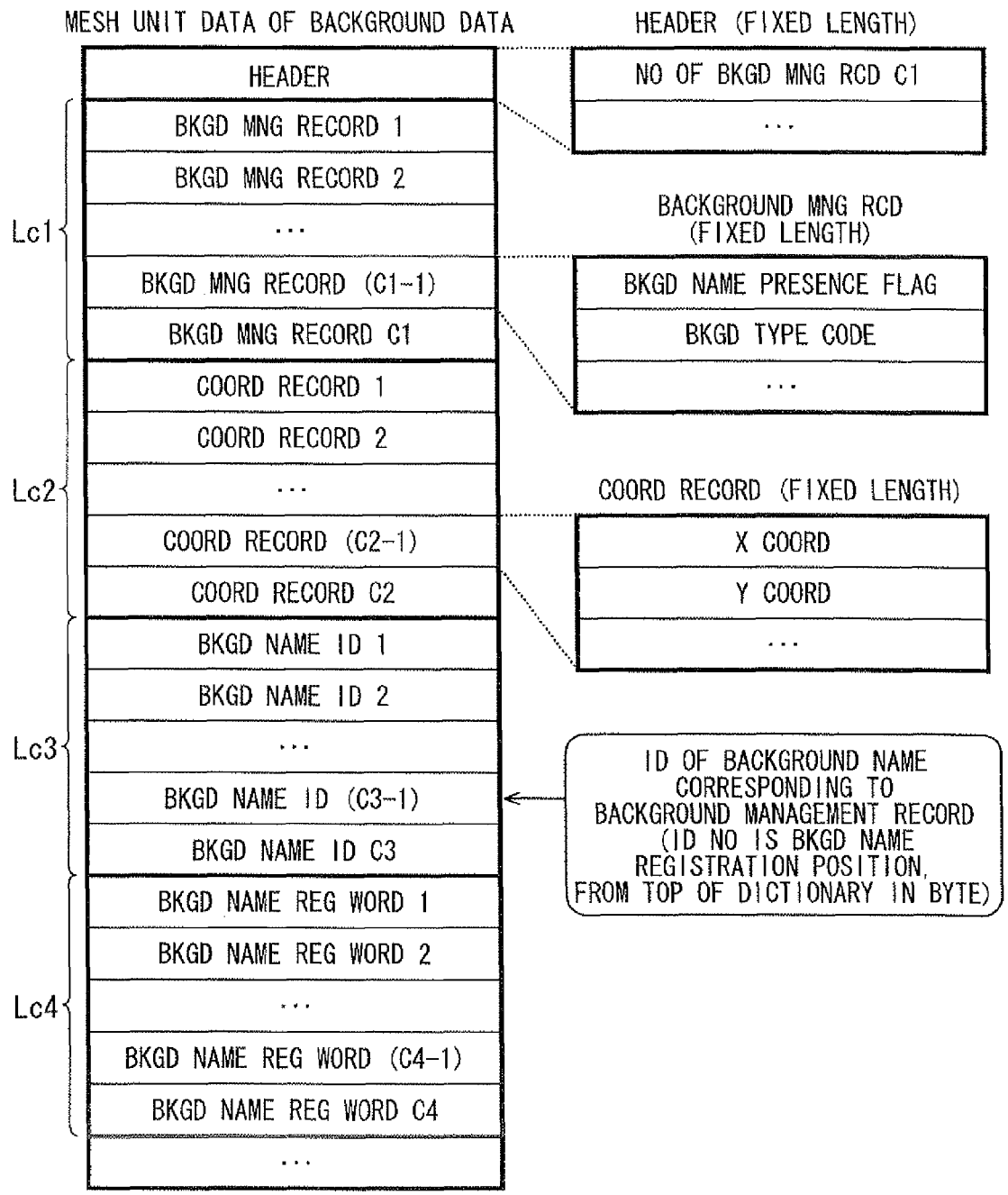
FIG. 7 is a configuration illustration of background data for each mesh in the embodiment.

The background data represents information of background in the map other than roads, as described above. The background data in the mesh unit data includes, as shown in FIG. 7, a background management list Lc1 listing background management records 1 to C1, a coordinate list Lc2 listing coordinate records 1 to C2, a background name ID list Lc3 listing background name IDs 1 to C3, a background name dictionary Lc4 listing background name vocabularies, i.e., registered entries of background names, together with other data.

(1. 3. 1 Header)

The header of the background data in the mesh unit data has a fixed data length, representing the number of the background management records C1 and the like.

(1. 3. 2 Background Management Record)

The background management record has a fixed data length for each of the records, and includes information such as a background name presence flag, a background classification code and the like. The background classification code represents the classification of background images to be displayed on the map. More practically, the background classification code represents classification of background images, according to, for example, facility classification such as a bank, a library, a museum, a park, a shopping center, a railway, and an airport, as well as geographical feature classification such as sea, lake, islands and the like.

The background image corresponding to each of the background classification codes is laid out at a position in the map specified by the coordinate record that is associated with the subject background management record.

The background name presence flag represents whether or not the name of the background to be laid out in the map is registered in the background name dictionary Lc4. For example, the background name indicative of a name of a facility or the like is displayed on the map under control of the background name presence flag.

(1. 3. 3 Coordinate Record)

Each of the coordinate records stored in the mesh unit data of the background data represents background image lay-out position (i.e., coordinates) corresponding to each of the background management records registered in the background management list Lc1. More practically, each coordinate record includes information of an X coordinate (the coordinate value of the longitude direction) and information of a Y coordinate (the coordinate value of the latitude direction). This coordinate record has a fixed data length.

The coordinate list Lc2 in the background data has the same number of records C2 (i.e., record 1 to record C2) included therein as the number of the background management records C1 registered in the background management list Lc1. In other words, the coordinate records 1 to C2 in the coordinate list Lc2 respectively have one-to-one correspondence with the background management records 1 to C1.

Figure 8:
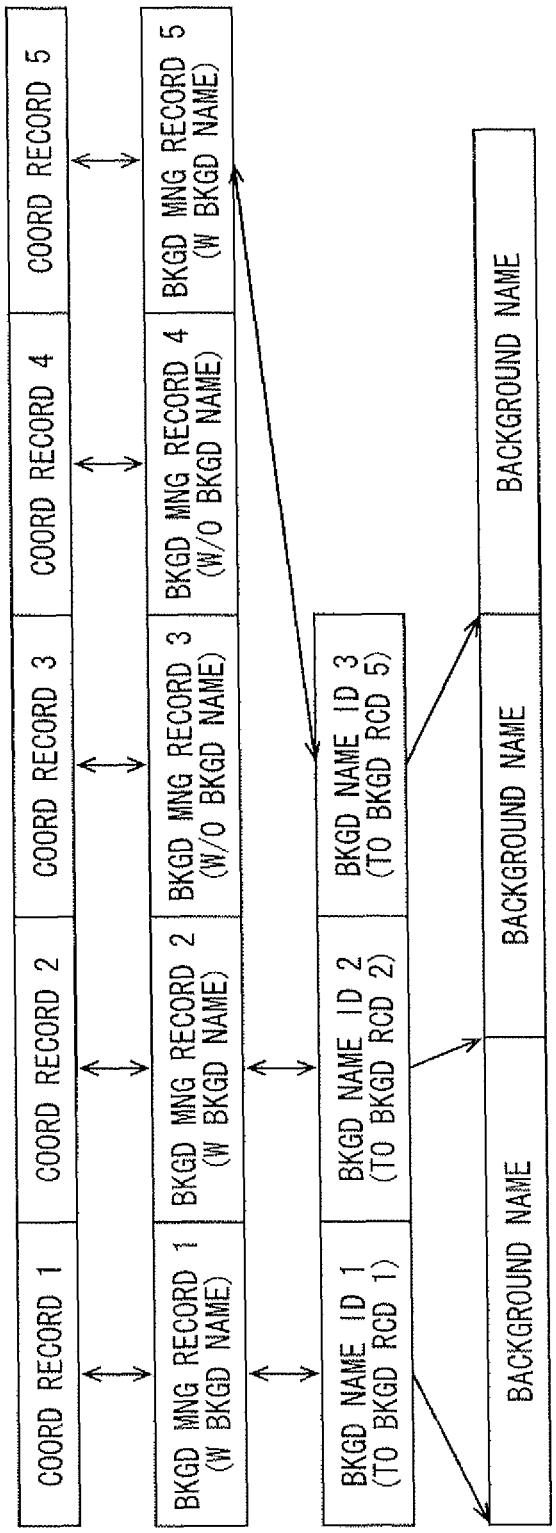
FIG. 8 is an illustration of arrangement of a background management record, the coordinate record and a background name ID of the background data as well as association therebetween in the embodiment.

More practically, the coordinate list Lc2 is formed as an arrangement of coordinate records 1 to C2 corresponding to the background image to be laid out according to the background management record that is registered in the background management list Lc1, as shown in FIG. 8. Note that the arrangement of the background management records in the background management list Lc1 and the arrangement of the coordinate records are the same. That is, the multiple types of attribute data regarding components of the background images are associated with each other.

(1. 3. 4 Background Name ID)

The background name ID is used to read a background name corresponding to the background management record in the background name dictionary Lc4, and specifies an offset (i.e., a byte position) from a start position of the background name dictionary Lc4. The background name ID has a fixed data length. In the map data structure of the present embodiment, reading of the background names is enabled based on the background name IDs.

Then, the background name IDs 1 to C3 are arranged in the background name ID list Lc3 in a specific manner, so that the background name IDs and the background management records in the background management list Lc1 correspond one-to-one, as shown in FIG. 8. In other words, the arrangement of the components of the background images corresponding to the background name IDs 1 to C3 in the list Lc3 and the arrangement of the counter parts in the background management list Lc1.

More practically, in making of the background name ID list Lc3, the order of the background name IDs are aligned with the order of the background management records in the background management list Lc1. However, if a part of the background names corresponding to the background management records are omitted, the positions of the omitted background name IDs are occupied by the background name ID records corresponding to the subsequent background management records. That is, no vacant record position is left in the list Lc3.

When a certain background management record has no corresponding background name ID registered in the background name ID list Lc3, that background management record has a background name presence flag having a value of "no info." Therefore, the background name IDs are referenced to and read from the top of the background management ID list Lc3 with reference to the background name presence flag, enabling the recognition of relationship between the background management records 1 to C1 and the background name IDs 1 to C3.

(1. 3. 5 Background Name Dictionary)

The background name dictionary Lc4 is formed as a group of registered background names 1 to C4 having variable data length. The registered background names are formed as text strings representing background names.

(1. 4 Traffic Division Data in Mesh Unit Data)

The traffic division data in the mesh unit data represents, while serving as extended data, traffic direction of each of the links in the subject data mesh. That is, whether the subject link in the mesh has a right-side traffic system, or a left-side traffic system is represented by the traffic division data. Therefore, the traffic division data is prepared only for the data mesh which has both of the right-side traffic and the left-side traffic.

Figure 9A:
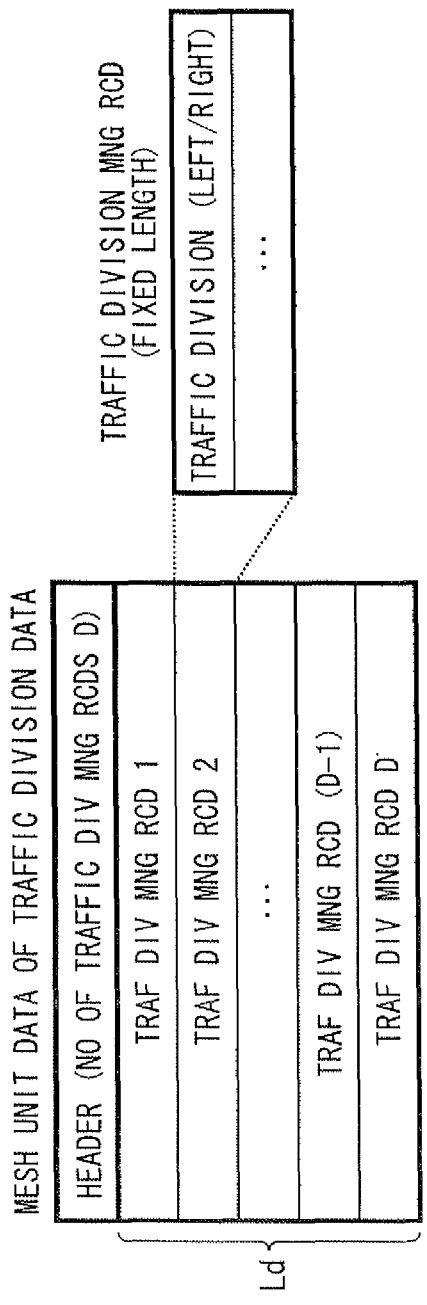
FIGS. 9A and 9B are a configuration illustration and association of traffic division data in the embodiment.

As illustrated in FIG. 9A, the traffic division data in a certain data mesh includes a traffic division management list Ld having a header and traffic division management records 1 to D. That is, FIG. 9A is a structure diagram of the traffic division data in the data mesh.

(1. 4. 1 Header)

The header of the traffic division data in the mesh unit data has a fixed data length, representing the number of the traffic division management records (e.g., the number "D" in this case) and the like.

(1. 4. 2 Traffic Division Management Records)

The traffic division management record has a fixed data length for each of the records, and includes a traffic division code of a corresponding link. The traffic division code takes either of two values, which are indicative of "right-side traffic" or "left-side traffic."

The traffic division management record is for each of the links in a corresponding data mesh. That is, the number of the traffic division management records 1 to D in the traffic division management list Ld is same as the number of the link records 1 to B2 in the link list Lb2 of the corresponding data mesh, and the data records in the traffic division management list Ld correspond one-to-one with the data records in the link list Lb2.

Figure 9B:
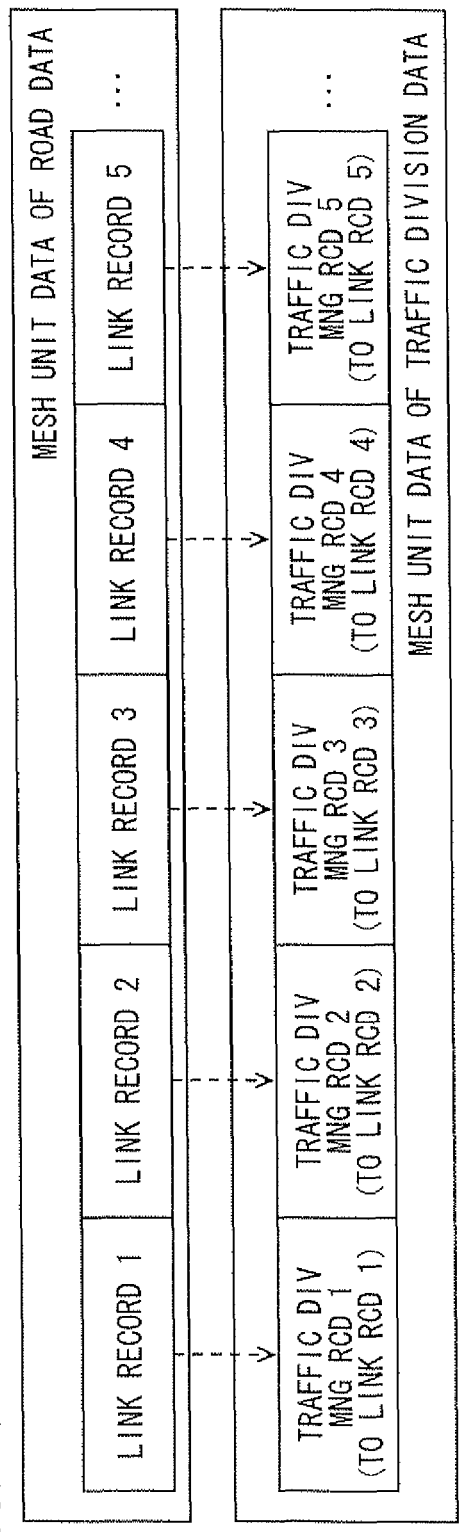

Then, the arrangement of the traffic division management records 1 to D in the traffic division management list Ld is so arranged that the arrangement of the links corresponding to the arrangement of the traffic division management records 1 to D becomes the same arrangement of the links in the link list Lb2. FIG. 9B illustrates the relationship between the arrangement of link records 1 to B2 in the link list Lb2 and the arrangement of traffic division management records 1 to D in the traffic division management list Ld.

In the map data of the present embodiment, each of the link records 1 to B2 in the link list Lb2 representing a road and each of the traffic division management records 1 to D in the traffic division management list Ld are associated with each other based on the same data arrangement scheme in both lists.

(1. 5 Speed Limit Data in Mesh Unit Data)

Figures 10A, 10B:
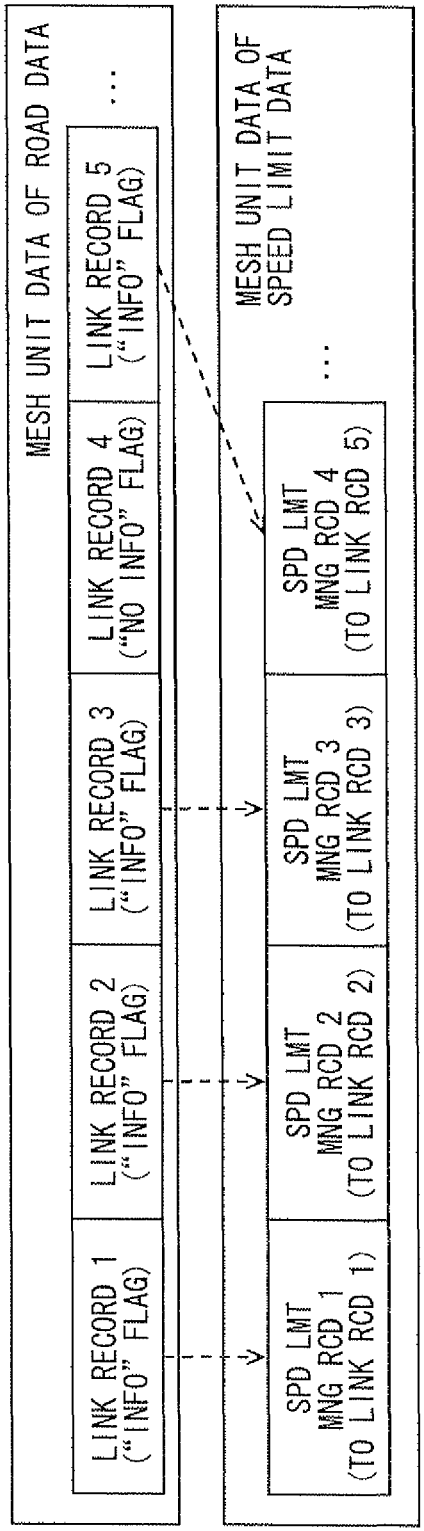
FIGS. 10A and 10B are a configuration illustration and association of speed limit data in the embodiment.

The speed limit data as the extended data represents the speed limit of each link. As shown in FIG. 10A, the speed limit data in a certain data mesh includes a header and a speed limit management list Le having of a header and speed limit management records 1 to E. That is, FIG. 10A is a structure diagram of the speed limit data in the data mesh.

(1. 5. 1 Header)

The header of the speed limit data in the mesh unit data has a fixed data length, representing the number of the speed limit management records (e.g., the number "E" in this case) and the like.

(1. 5. 2 Speed Limit Management Record)

The speed limit management record represents a forward-direction speed limit and a backward-direction speed limit of a corresponding link. If the link has no speed limit, a value indicative of "no speed limit" is recorded as a forward-direction speed limit and a backward-direction speed limit of the speed limit management record. If the traffic in the corresponding link is one-way, the speed limit of an "against" direction traffic takes a "null" value.

Then, each of the link has only one speed limit management record registered in the speed limit management list Le. More practically, as shown in FIG. 10B, the speed limit management list Le lists, for each of the link having the link record registered in the link list Lb2 in the corresponding mesh, the speed limit management records 1 to E in the same arrangement order as the arrangement of the links in the link list Lb2. FIG. 10B illustrates the relationship between the arrangement of link records 1 to B2 in the link list Lb2 and the arrangement of speed limit management records 1 to E in the speed limit management list Le.

However, for the link record having a "no info" value in a speed limit information presence flag, no corresponding speed limit management record is registered in the speed limit management list Le. In other words, while the speed limit management records in the list Le are generally arranged in association with the link records in the list Lb2, which are arranged from younger sequence numbers to older sequence numbers, a position in the speed limit management list Le is occupied by the speed limit management record corresponding to the next link record in the link list Lb2, when a speed limit management record corresponding to a certain link record in the link list Lb2 is not registered in the speed limit management list Le. That is, when a certain corresponding relationship is "skipped," the next record fills the skipped position.

In the map data of the present embodiment, each of the link records 1 to B2 in the link list Lb2 in the road data, which serves as the basic data, and each of the speed limit management records 1 to E in the speed limit management list Le in the speed limit data, which serves as the extended data are associated with each other. The link record is, in this case, considered as the attribute data of basic attribute regarding a link, which is indispensable in the map data, and the speed limit management record is considered as the attribute data of extended attribute regarding a link, which is optional in the map data depending on the data model. That is, the link record representative of one attribute and the speed limit management record representative of another attribute are associated with each other in the above-described manner, for "multi-attribute" association of a certain link.

(1. 6 TMC Data in Mesh Unit Data)

Figure 11A:
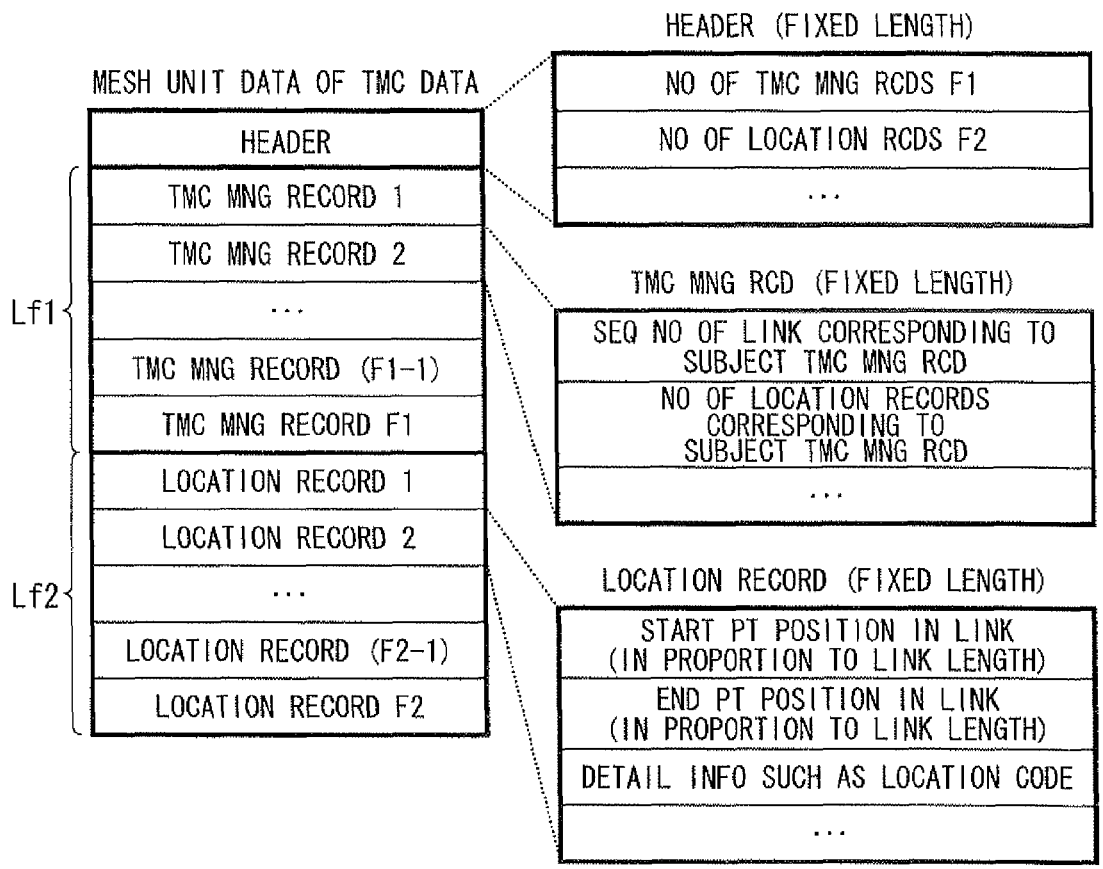
FIGS. 11A and 11B are a configuration illustration and association of TMC data in the embodiment.

The TMC data as the extended data is used to determine the relationship between a location code in the traffic information that is transmitted from a roadside unit, a base station or the like and a link. The TMC data in a certain data mesh includes a TMC management list Lf1 having a header and TMC management records 1 to F1, and a location list Lf2 having location records 1 to F2. FIG. 11A is a structure diagram of the TMC data in the data mesh.

(1. 6. 1 Header)

The header of the TMC data in the mesh unit data has a fixed data length, representing the number of the TMC management records F1, the number of the location records F2, and the like.

(1. 6. 2 TMC Management Record)

The TMC management record has a fixed data length for each of the records, and includes information of the relationship between the location code in the location record and the link record. More practically, the TMC management record includes, for identifying a link that corresponds to the subject TMC management record, a sequence number information of a link record from the top of the link list Lb2, the link record that corresponds to the subject TMC management record in the same data mesh. This information in the TMC management record associates the TMC management record with the link record.

Then, the TMC management record has information of the number of the location records corresponding to the subject TMC management record. In the map data of the present embodiment, plural location records are assigned to a single TMC management record in some cases. Therefore, the number of the location records is stored in the TMC management record.

Further, though the sequence number information of a link record is used to associate the TMC management record and the link record, the TMC management records 1 to F1 can also be associated with the link records 1 to B2 by the arrangement of the TMC management records 1 to F1 in the TMC management list Lf1 in the map data of the present embodiment.

The TMC management records 1 to F1 are so arranged that, the arrangement of the links corresponding to the TMC management records 1 to F1 and the arrangement of the links registered in the link list Lb2 (i.e., the arrangement of the link records 1 to B2) have the same arrangement order. In this case, if a TMC management information presence flag has a value of "no info" in the link record, no corresponding TMC management record is registered in the TMC management list Lf1. This is the same registration scheme as the speed limit management list Le.

(1. 6. 3 Location Record)

The location record has a fixed data length for each of the records, and includes a location code and information of a range of the road to which the location code is applied, together with other information.

As is generally known, traffic information is transmitted from a roadside unit or the like, in a form that is made up fromA a body of the traffic information and a location code that indicates which district the transmitted traffic information is for. In this case, the location code is arbitrarily set irrespective of the map data, thereby setting a range of the road in a different manner from a range of the road defined by the links in the map data.

Figure 11B:
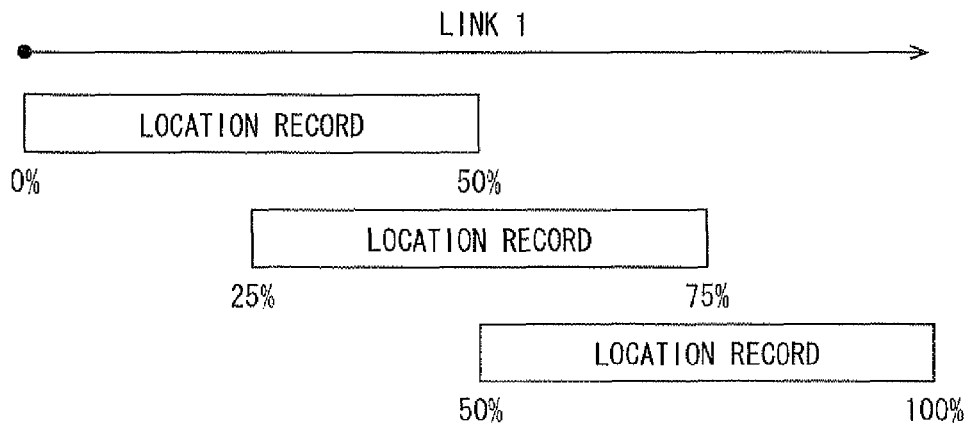

Therefore, the location record has information of the range of the road, in which, a portion of a corresponding link (e.g., from which point to which point in the link) actually corresponding to the location code in the subject location record is specified. In this case, a start point is represented by a distance from the start point of the link, which is measured as a "proportion" to the link length, as shown in FIG. 11B. An end point is, in the same manner as the start point, represented by a proportion of distance from the start point of the link.

FIG. 11B illustrates the relationship between the link and the location record. In the location list Lf2, the location records 1 to F2 are so arranged that the arrangement of the links corresponding to the arrangement of the location records and the arrangement of the links corresponding to the arrangement of the TMC management records in the TMC management list Lf1 have the same arrangement order.

(1. 7 Guidance/Lane Data in Mesh Unit Data)

Figure 12:
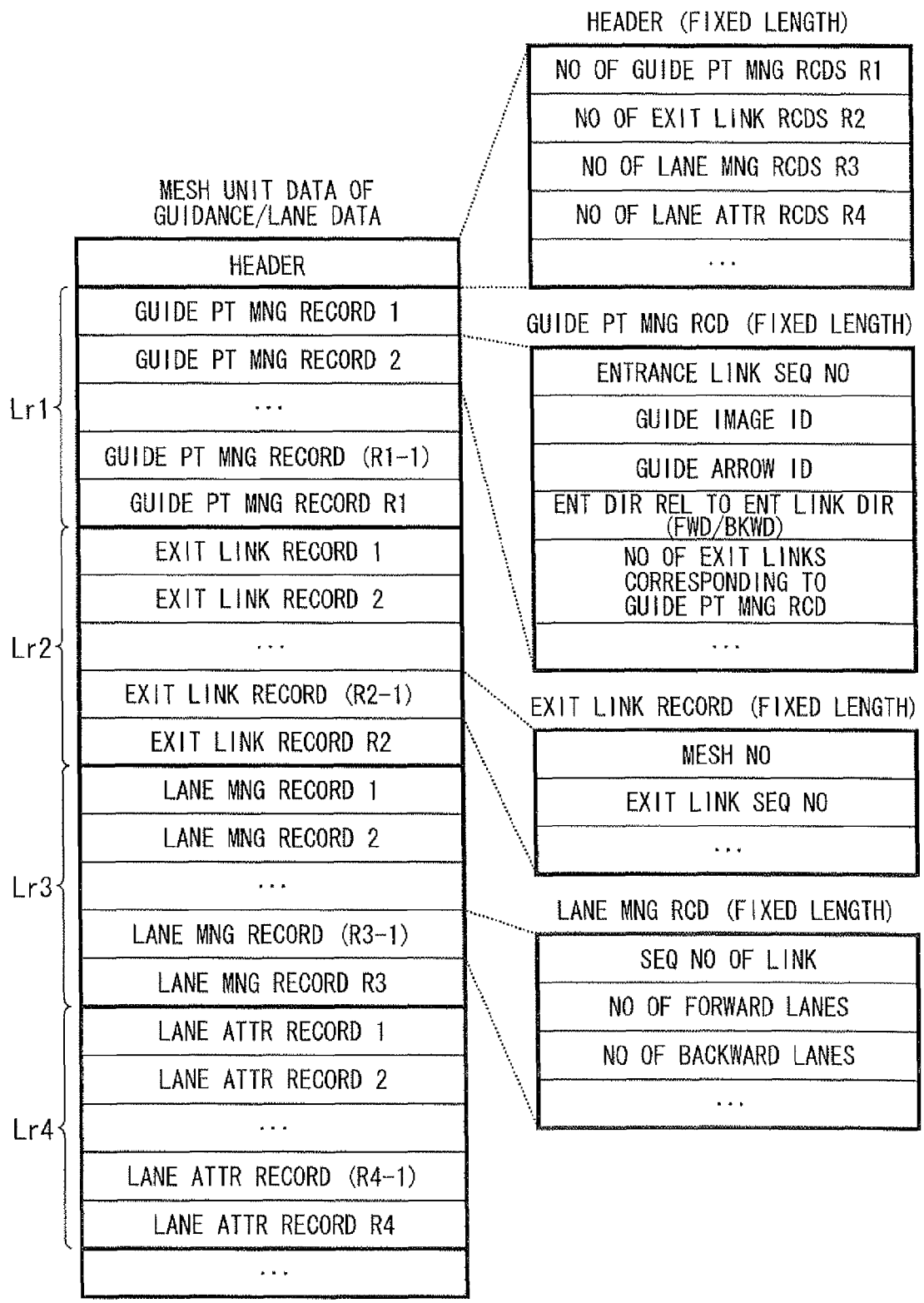
FIG. 12 is a configuration illustration of guidance/lane data in the embodiment.

The guidance/lane data as the extended data includes information regarding a guidance point and/or lanes in each link. As shown in FIG. 12, the guidance/lane data in the mesh unit data has a guidance point management list Lr1 having guidance point management records 1 to R1, an exit link list Lr2 having exit link records 1 to R2, a lane management list Lr3 having lane management records 1 to R3, and a lane attribute list Lr4 having lane attribute records 1 to R4, together with other information.

(1. 7. 1 Header)

The header of the guidance/lane data in the mesh unit data has a fixed data length, and includes information of the number of guidance point management records R1, the number of exit link records R2, the number of lane management records R3 and the number of lane attribute records R4, together with other information.

(1. 7. 2 Guidance Point Management Record)

The guidance point management record has a fixed data length for each of the records, and is used to represent each of the guidance points of the corresponding data mesh. The guidance point management record includes information indicative of an entrance link to the guidance point, a guidance image ID to be displayed at the guidance point, a guidance arrow ID to be displayed at the guidance point, an entrance direction to the guidance point relative to the entrance link direction (from a start point to an end point of the link), the number of exit links for exiting from the guidance point, together with other information. The information indicative of an entrance link to the guidance point is described by using the sequence number of the link record corresponding to the above entrance link in the link list Lb2 in the same data mesh. Based on this information, the guidance point management record is associated with the link record.

(1. 7. 3 Exit Link Record)

The exit link record has a fixed data length for each of the records, and includes information indicative of the above-described exit link. More practically, the exit link record includes a mesh number that has the exit link and a sequence number of the link record corresponding to the exit link in the link list Lb2 in that mesh.

In the exit link list Lr2, the exit link records 1 to R2 are so arranged that the arrangement of the guidance points corresponding to the arrangement of the exit link records 1 to R2 and the arrangement of the guidance points in the in the guidance point management list lr1 have the same arrangement order, as shown in FIG. 13A. FIG. 13A illustrates the relationship of the arrangement of the guidance point management records 1 to R1 and the exit link records 1 to R2.

In the present embodiment, the guidance point management records 1 to R1 and the exit link records 1 to R2 are associated by "aligning" the guidance point arrangement in the guidance point management list Lr1 with the guidance point arrangement in the exit link list Lr2.

(1. 7. 4 Lane Management Record)

The lane management records has a fixed data length for each of the records, and represents each of the links in the data mesh. The lane management record has information indicative of a link corresponding to the subject lane management record, the number of lanes in a forward direction traffic (the traffic lane having a traffic direction from a link start point to a link end point) in the link, and the number of the lanes in an backward direction traffic (the traffic lane having a traffic direction from a link end point to a link start point) in the link.

In this case, the "information indicative of a link corresponding to the subject lane management record" is described as a position (i.e., a sequence number) of a link record from the top of the link list Lb2, the corresponding link record registered in the link list Lb2 in the data mesh that is same mesh having the subject lane management record. Further, this lane management record is associated with the lane attribute records, the number of which is a total of the number of forward direction traffic lanes and the number of backward direction traffic lanes.

(1. 7. 5 Lane Attribute Record)

The lane attribute record represents the attribute of a corresponding lane. For example, the lane attribute record includes information of the subject lane regarding whether the lane is a right turn lane, whether the lane is a left turn lane, whether the lane is a straight travel lane, and whether the lane includes a merge point, together with other information.

The lane attribute records 1 to R4 have a fixed data length for each of the records, and, as shown in FIG. 13B, are so arranged that the arrangement of the links corresponding to the arrangement of the lane attribute records 1 to R4 in the lane attribute list Lr4 and the arrangement of the links corresponding to the lane management records in the lane management list Lr3 have the same arrangement order. In this case, the guidance/lane data is so arranged that a single lane management record is associated with plural lane attribute records, in an order that the lane attribute record of the forward direction traffic lane precedes the lane attribute record of the backward direction traffic lane, as shown in FIG. 13B. FIG. 13B illustrates the relationship between the arrangement of the lane management records 1 to R3 and the arrangement of the lane attribute records 1 to R4. The lane management records 1 to R3 and the lane attribute records 1 to R4 are associated with each other in the above-described manner in the present embodiment.

(1. 8 Summary of Map Data)

The configuration of the map data is explained in the above. According to the configuration of the map data in the present embodiment, attribute data of the map components are classified and grouped by the attribute types, rather than classified and grouped by the map components, to be formed as a data list. For example, attribute data of a certain link, such as a link record, an address range record, a speed limit management record and the like, is not grouped by the link, but by each of the multiple attribute types, to be formed as a data list. That is, the link list Lb2, the address range list Lb7, and the speed limit management list Le are formed in the above-described manner. Therefore, according to the present embodiment, the contents of the map data can be easily changed and edited.

Conventionally, even when only a certain attribute type of the map data is updated, the entire map data has to be updated. The configuration of the map data of the present embodiment has now enabled that a certain attribute type of the map data can be updated only by replacing a data list of the attribute data for that specific attribute type in the map data. Therefore, the update of the map data can be easily performed. Specifically, thanks to an improved communication function in the vehicle, only an updated portion of the map data is transmitted from a data center to be installed in the vehicle when the configuration of the map data is based on the present embodiment, thereby greatly facilitating the map data update scheme through the communication function.

Then, the map data configuration in the present embodiment allows the user to easily change the combination of various types of data lists in the map data, especially data in the extended data group, for the purpose of changing the map data contents. In other words, various map data versions can be easily created. For example, manipulation of the map data, such as deleting the speed limit data and adding the speed limit data, can be easily performed, for creating the map data having the speed limit information or creating the map data having no speed limit data. Therefore, depending on the user needs, various types of map data can be created and sold.

Thus, the two or more product lines can be easily created by preparing the map data having the speed limit information as a high-end version, and the map data having no speed limit information as a popular-edition. Further, map data components can be easily distributed and sold as optional data for allowing the user to customize the map data. Therefore, the map data of the present embodiment can be so configured that the speed limit data can be purchased separately after the purchase of the body of the map data.

Then, the ease of the contents change of the map data allows the maker of the navigation apparatus and/or the maker of the map data to create various map data versions to be adapted to various product types of the navigation apparatus. In other words, the map data for each of the various product types need not be created from the scratch, but be modified or customized based on the basic model of the map data due to the ease of data editing.

Further, though the grouping of the attribute data according to the attribute types necessitates the association among various attribute data types (i.e., various records) of a map component, the map data of the present embodiment enables the attribute data association by a suitable data arrangement in the data list. That is, no additional data such as attribute IDs, link IDs or the like is required for attribute data association. Therefore, the map data of the present embodiment has a smaller data volume in comparison to the conventional map data having the same amount of contents.

Furthermore, in the present embodiment, each record of the map data has basically a fixed data length, thereby enabling the omission of not only the link ID inserted at the top of the record but also the data boundary code inserted at, for example, the end of the record. Therefore, the map data of the present embodiment can further be reduced in the data volume. Further, each of the attribute data record can be easily accessed due to the fixed data length of the data record. That is, the position of the data record can be easily identified by the offset from the top of the data list based only on the sequence number of the desired data record.

Then, according to the present embodiment, flags (e.g., a speed limit information presence flag and an address range information flag) in a link record allows the navigation apparatus to grasp the presence of a corresponding record registered in other data lists (e.g., a speed limit management list Le and ab address range list Lb7). Therefore, even in the data record association scheme of the present embodiment which utilize the data record arrangement, the records in the speed limit management list Le and/or the address range list Lb7, which correspond to some of the links, can be omitted from the lists. Thus, the data volume of the map data can be reduced and the efficiency of data association between the link records and attribute records can be improved at the same time.

By the way, the address range list Lb7 classified as the basic data in the above embodiment may be classified as the extended data. In other words, classification of data types as to basic data or to extended data may be arbitrarily changed in the present embodiment. The basic/extended data type classification may only be used to facilitate the creation of various map data versions, by having body of the map data as the basic data, with the other optional data portions categorized as the extended data, in terms of adaptation of various versions to respective product lines of the navigation apparatus, for example.

Further, in the present embodiment, the features and/or the characteristics of the map component (e.g., links and the like) are classified and described as several types of attribute data, to be formed as groups of attribute data of each type. However, in the course of grouping, grouping of attribute types may be, for the large part, arbitrarily designed and changed according to the idea of the map data designer. In other words, how to define those attributes and what is defined as each of the attributes are up to the map data designer. The only consideration of the attribute design of the map data may be the separation of the attributes into two categories of basic data and the extended data, for example. That is, grouping of the attribute data types may be taken into account of the definition of the attribute data of one kind, and the attribute data of other kinds may be added based on the definition of the attribute data and the grouping policy of the attribute data. This designing scheme of the attribute data may be recognized from recitation of basic data list formulation process and extended data list formulation process in claims.

(2 Structure and Operation of Navigation Apparatus)

The map data described above is used in the following manner by a navigation apparatus 10.

Figure 14:
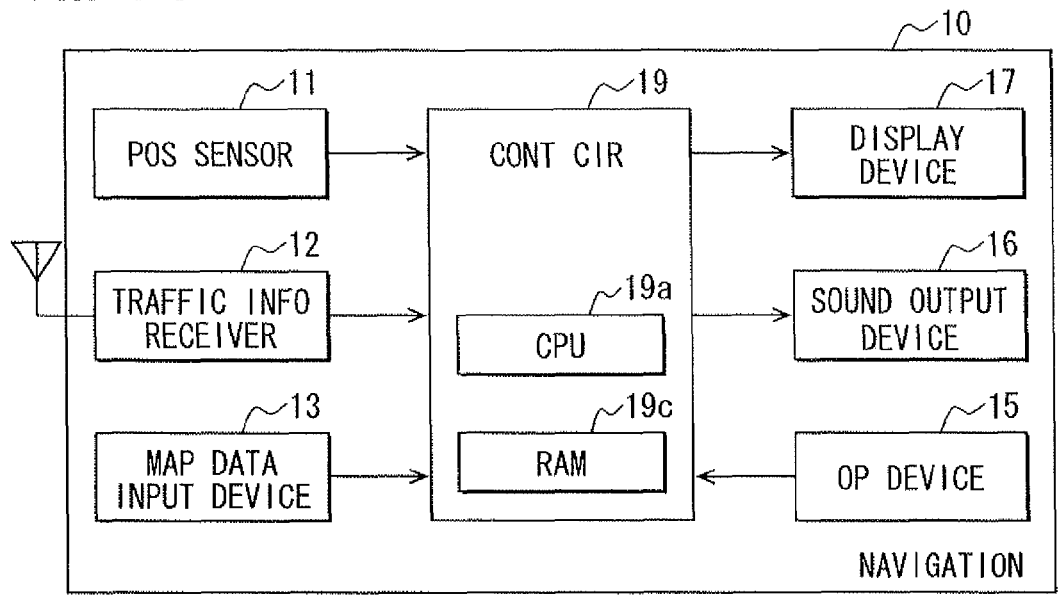
FIG. 14 is a block diagram of configuration of a navigation apparatus in the embodiment.

The navigation apparatus 10 shown in FIG. 14 includes a position sensor 11, a traffic information receiver 12, a map data input device 13 maintaining map data of the above configuration, an operation device 15, a voice output device 16, a display device 17 and a control circuit 19.

The position sensor 11 is used for detecting a current position of the vehicle that is equipped with the navigation apparatus 10, by having a well-known gyroscope, a range sensor, a GPS receiver and the like. The traffic information receiver 12 is used for receiving receive traffic information transmitted from a roadside unit and/or a base station.

The map data input device 13 has a recording medium (more concretely, a hard disk, a DVD) in which the above-mentioned map data is stored, and the map data stored by the recording medium is input to the control circuit 19. The map data input device 13 may have a DVD drive beside a hard disk drive (HDD) for the storage of the map data. If the map data input device 13 is configured in the way described above, the navigation apparatus 10 can be configured to install an additional map data recorded on the DVD media onto the HDD, which is sold optionally. In addition, the navigation apparatus 10 may have a communication device (not illustrated) for communication with a map data distribution center, for the purpose of updating the installed map data on the HDD in the map data input device 13, based on the map data received by the communication device from the map data distribution center.

The operation device 15 is used for inputting user instructions to the control circuit 19, and includes a touch panel disposed on the display device 17 and operation switches arranged on the main body or on the remote controller of the navigation apparatus 10. Through the operation device 15, the user can perform various operations of the navigation apparatus 10 such as map scale change, map scrolling, destination setting and the like.

The voice output device 16 includes a speaker and the like, and outputs guidance sounds to the user by receiving a signal from the control circuit 19. The display device 17, which is capable of displaying images in "full color," is used for, for example, displaying a position mark of the current vehicle position detected by the position sensor 11, a guidance route and the like, together with a map image input from the map data input device 13.

The control circuit 19 is configured to be serving as a well-known microcomputer, and includes a CPU 19a, a ROM (not illustrated), a RAM 19c, an input/output (I/O), a bus line for connection of these components. The CPU 19a executes a program memorized in the ROM for performing process based on the signals from the position sensor 11, the traffic information receiver 12, the map data input device 13, and the operation device 15.

More practically, the control circuit 19 reads the map data for each of the data meshes from the map data input device 13 by performing the program in the CPU 19a, and the data is then loaded in the RAM 19c, to perform process such as route search, route guidance and the like based on the loaded data in the RAM 19c.

Figure 15:
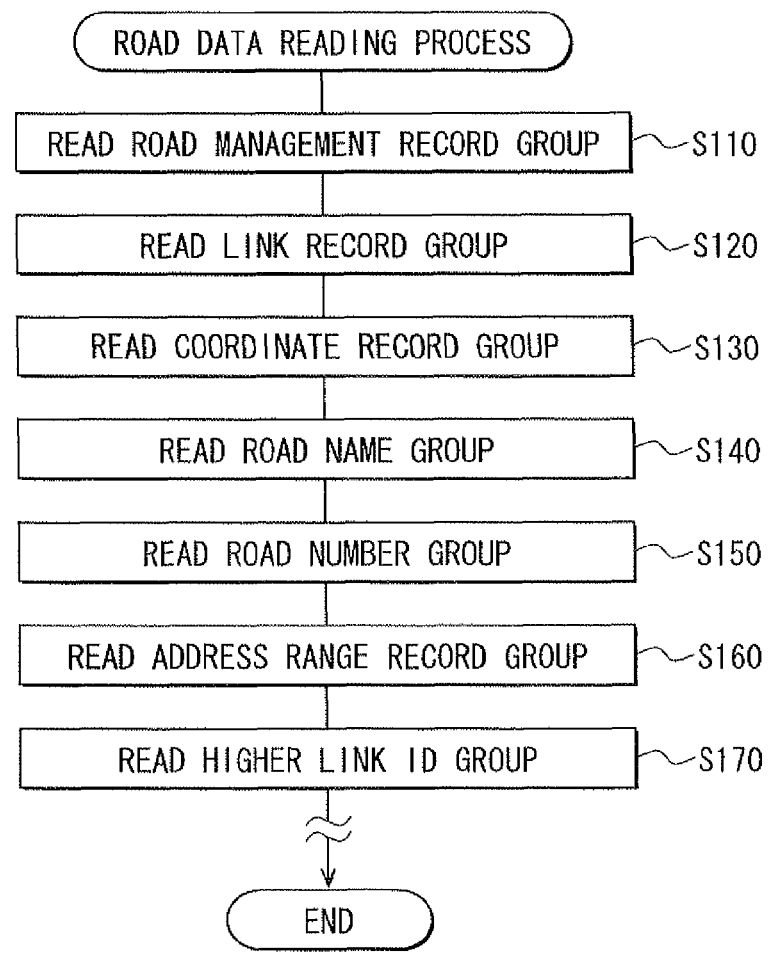
FIG. 15 is a flowchart of a road data reading process in the embodiment.

The map data loading process by the control circuit 19 from the map data input device 13 is explained in the following with reference to a flowchart in FIG. 15. FIG. 15 illustrates a road data reading process in a flowchart form. The mesh unit data of the road data is retrieved in this process by the control circuit 19.

When the road data reading process in FIG. 15 is carried out, as a basic data reading process, the control circuit 19 carries out a process step S110 to read a road management record group from the reading-object mesh unit data, a process step S120 (details in FIG. 16A) to read a link record group, a process step S130 (details in FIG. 16B) to read a coordinate record group, a process step S140 (details in FIG. 17) to read a road name group, a process step S150 (details in FIG. 17) to read a road number group, a process step S160 (details in FIG. 18) to read an address range record group, and a process step S170 to read a higher link ID group.

Figure 16A:
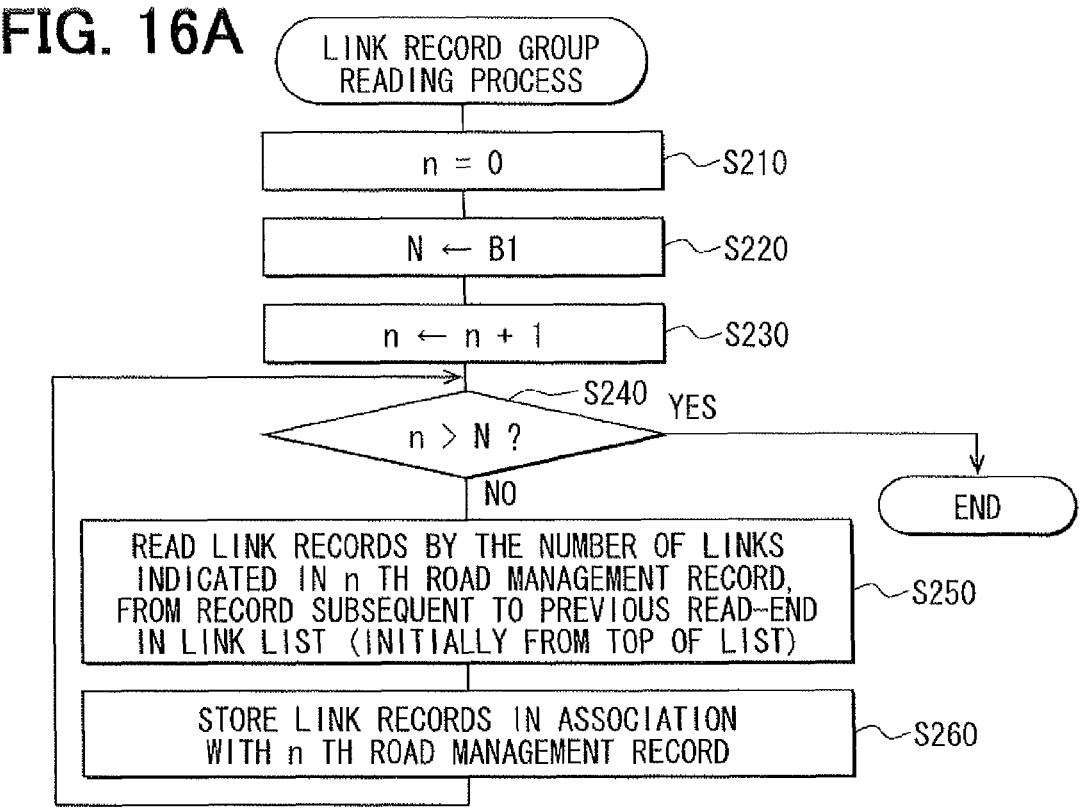
FIGS. 16A and 16B are flowcharts of a link record reading process and a coordinate record reading process in the embodiment.

More practically, the road management record group arranged in the road management list Lb1 in the reading-object mesh unit data is read sequentially from the top of the road management list Lb1 in S110. Then, by carrying out the link record group reading process shown in FIG. 16A, the link record group is read from the map data input device 13 and is loaded in the RAM 19c in S120, in association with the road management record group which is read the earlier step. FIG. 16A illustrates a link record group reading process in a flowchart form.

In S120, a variable n is initialized to 0 (zero) in the beginning as shown in FIG. 16A (S210), and a variable N is set to a value B1, the number of the road management records (S220), and a process loop of following steps S230 to S260 is carried out until a condition of n>N is fulfilled. More practically, the road management record is referred to by a sequence number 'n' in the record, in an order of 1, 2, ..., N, and the link records are read by the number of links indicated in the n th road management record from the next record, which is subsequent to the previous read-end link record in the link list Lb2 (S250). The link records being read in this manner are associated with the previously-read road management record having the sequence number n to be stored in the RAM 19c (S260). When the value of n is equal to 1, the link records are read from the top record of the link list Lb2 in S250 by the number indicated in the first road management record. In S120, the link records are read sequentially in this way from the top of the link list Lb2, and are associated with the road management record group which is loaded in the RAM 19c.

Figure 16B:
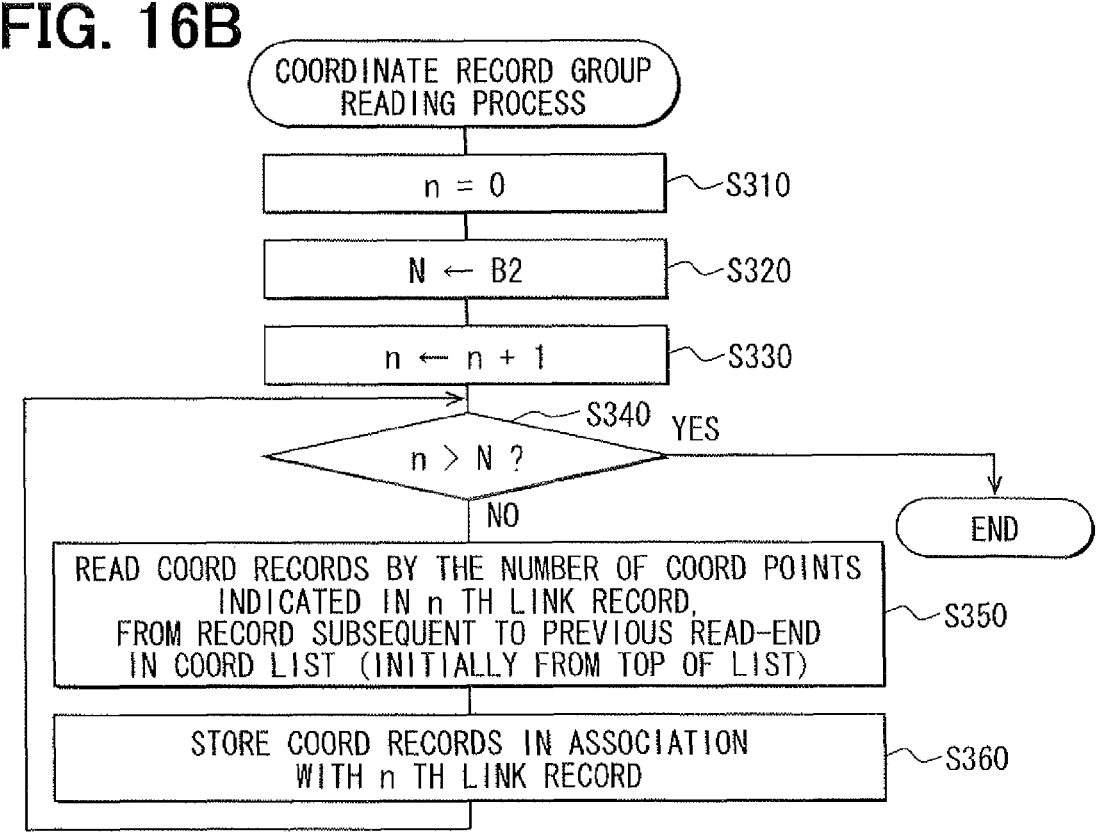

Then, in S130, by carrying out the coordinate record group reading process shown in FIG. 16B, the coordinate record group read from the map data input device 13 is loaded in the RAM 19c in association with the link record group which is read in the earlier step. FIG. 16B illustrates the coordinate record group reading process in a flowchart form. The essential idea of the coordinate record group reading process is same as the link record group reading process.

More practically, in S130, a variable n is initialized to 0 (zero) in the beginning (S310), and a variable N is set to a value B2, the number of the link records (S320), and a process loop of following steps S330 to S360 is carried out until a condition n>N is fulfilled. In this manner, "with reference to the link record having the sequence number n, the coordinate records are read by the number of coordinate points indicated in the referenced (i.e., No. n) link record from the next record, which is subsequent to the previous read-end record in the coordinate list Lb3, to be stored in the RAM 19c in association with the link record having the sequence number n, for the value of n=1, 2, . . . N." When the value of n is equal to 1 in S350, the coordinate records are read from the top of the coordinate list Lb3 by the number of coordinate points indicated in the first link record. The process in S130 associates each of the coordinate records with the link record group stored in the RAM 19c after reading those records from the coordinate list Lb3.

Figure 17:
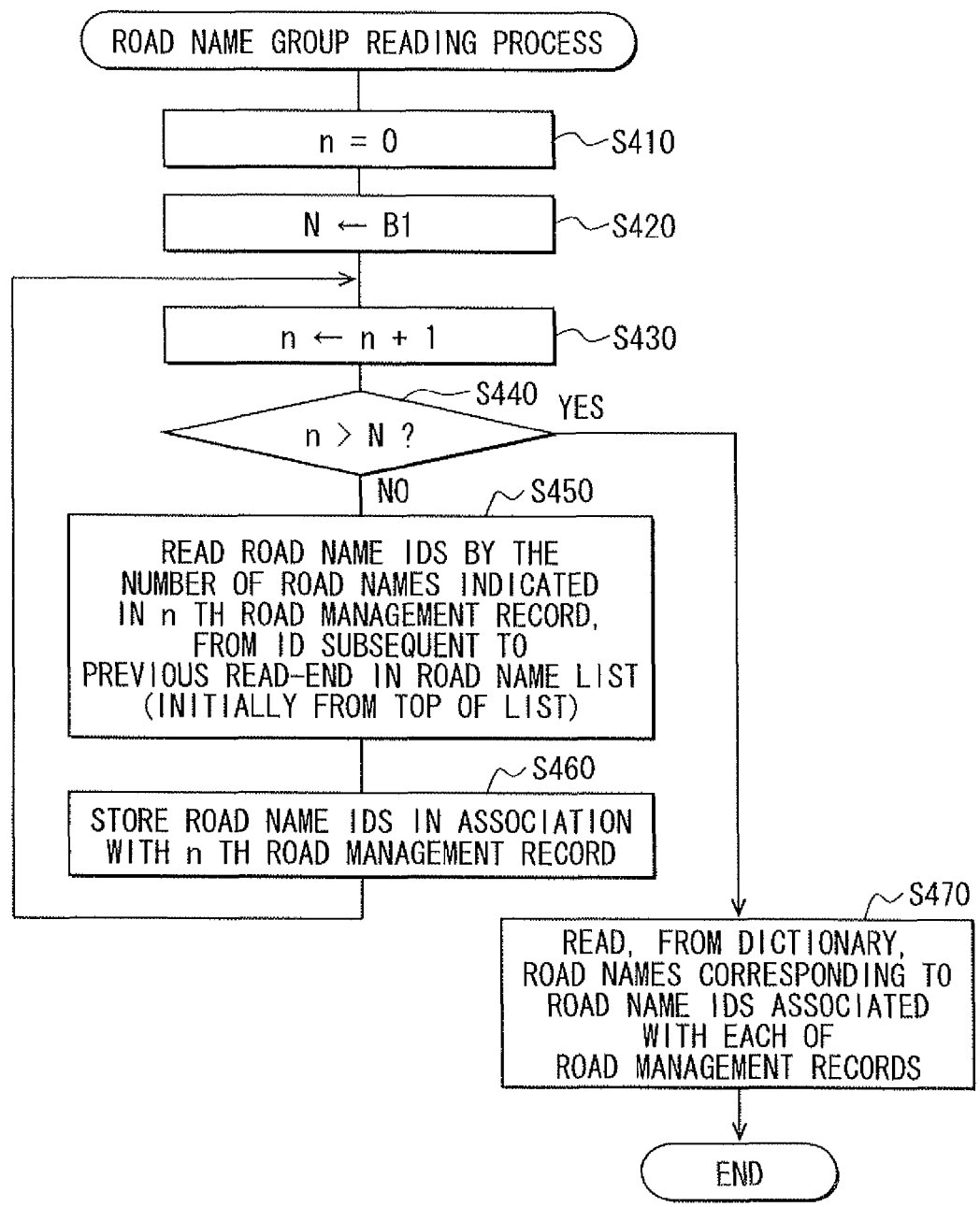
FIG. 17 is a flowchart of a road name group reading process in the embodiment.

Then, in S140, by carrying out the road name group reading process shown in FIG. 17, the road name group read from the map data input device 13 is loaded in the RAM 19c, in association with the road management record group which is read earlier. FIG. 17 illustrates the road name group reading process in a flowchart form.

More specifically, in S140, a variable n is initialized to 0 (zero) in the beginning (S410), and a variable N is set to the value B1, the number of the road management records (S420), and a process loop of following steps S430 to S460 is carried out until a condition n>N is fulfilled. In this manner, "with reference to the road management record having the sequence number n, the road name IDs are read by the number of road names indicated in the referenced road management record from the next record, which is subsequent to the previous read-end record (ID) in the road name ID list Lb4, to be stored in the RAM 19c in association with the road management record having the sequence number n, for the value of n=1, 2, . . . N."

In this case, when the above process is for the first time (i.e., n=1) in S450, the number of the road names indicated in the first road management record is used to read the road name IDs from the top of the road name ID list Lb4. If the number of road names indicated in the road management record is 0 (zero), the process returns to the top of the loop without reading the road name IDs from the road name ID list Lb4. In other words, the read-end record is not updated before returning to the top of the loop.

In S140, each of the registered road name IDs is read from the road name ID list Lb4 in the above-described manner, and is associated with the road management record group which is stored in the RAM 19c.

Then, after performing the above process loop, with reference to an area in the road number dictionary Lb6 corresponding to each of the road name IDs respectively associated with the road management record, the actual road name (i.e., road name text string) is read from the dictionary Lb6. Then, the actual road name read from the dictionary Lb6 is stored in the RAM 19c (S470).

Then, in S150, by performing a substantially similar process as the road name group reading process for the road number ID list Lb5, the road numbers corresponding to each of the road management records stored in the Ram 19c is read from the road number dictionary Lb6, and is associated with the road management record.

Figure 18:
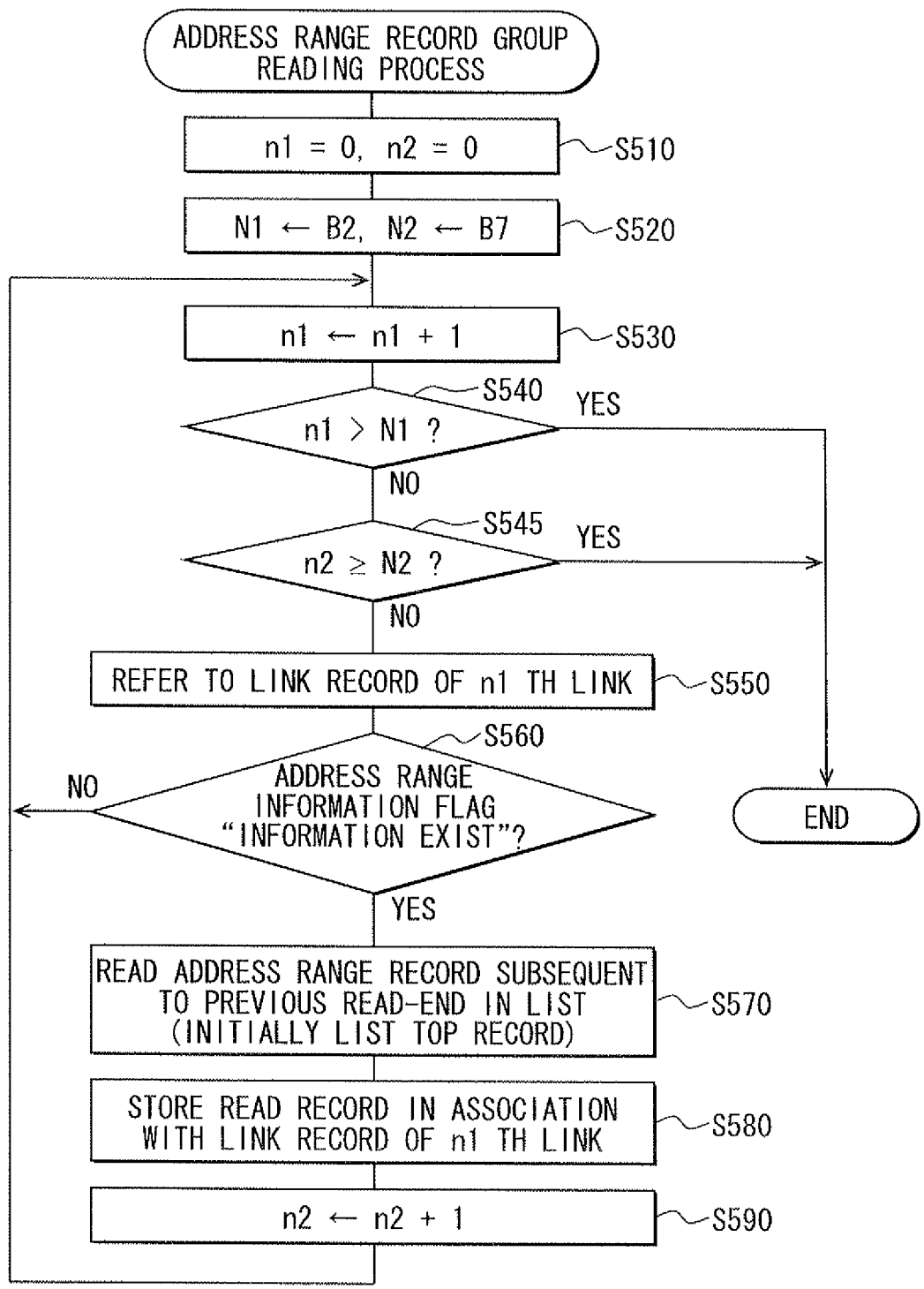
FIG. 18 is a flowchart of an address range reading process in the embodiment.

Then, in S160, by carrying out an address range record group reading process shown in FIG. 18, the address range record group is read from the map data input device 13, and is loaded in the RAM 19c in association with the link record group which is read earlier. FIG. 18 illustrates the address range record group reading process in a flowchart form.

More practically, in S160, variables n1, n2 are initialized to 0 (zero) in the beginning (S510), and a number N1 is set to the value B2, the number of the link records, and a number N2 is set in the value B7, the number of the address range records (S520). Then, until a condition n1>N1 is fulfilled (S540, Yes) or until a condition n2≥N2 is fulfilled (S545, Yes), a process loop of following steps S530 to S590 is carried out by counting up the variables n1, n2. In this case, the variable n1 is counted up at the beginning of the loop (S530), and the variable n2 is counted up each time the address range record is read (S590).

Therefore, in the process loop of S530 to S590, in an order of n1=1, 2, . . . N1, the link record having the sequence number n1 is referred to (S550), either (a) for reading the address range record in steps S570 to S590 and associating the read record with the above link record having the sequence number n1 if the address range information flag indicates "information exist" (S560:Yes) or (b) for returning to the top of the loop without reading the address range record (S530) and referring to the next link record (S550) if the address range information flag indicates "no information" (S560:No).

In details, steps S570 to S590 read the subsequently arranged address range records by employing the previous read-end record in the address range list Lb7 as a point of reference, and store, in the RAM 19c, the read records in association with the link record having the sequence number n1. In this case, in S570 just after the start of the address range record group reading process, the top address range record in the address range list Lb7 is read. In this manner, in S160, the address range records are read from the address range list Lb7 sequentially, and are associated with the link record group which is being stored in the RAM 19c.

Figure 19A:
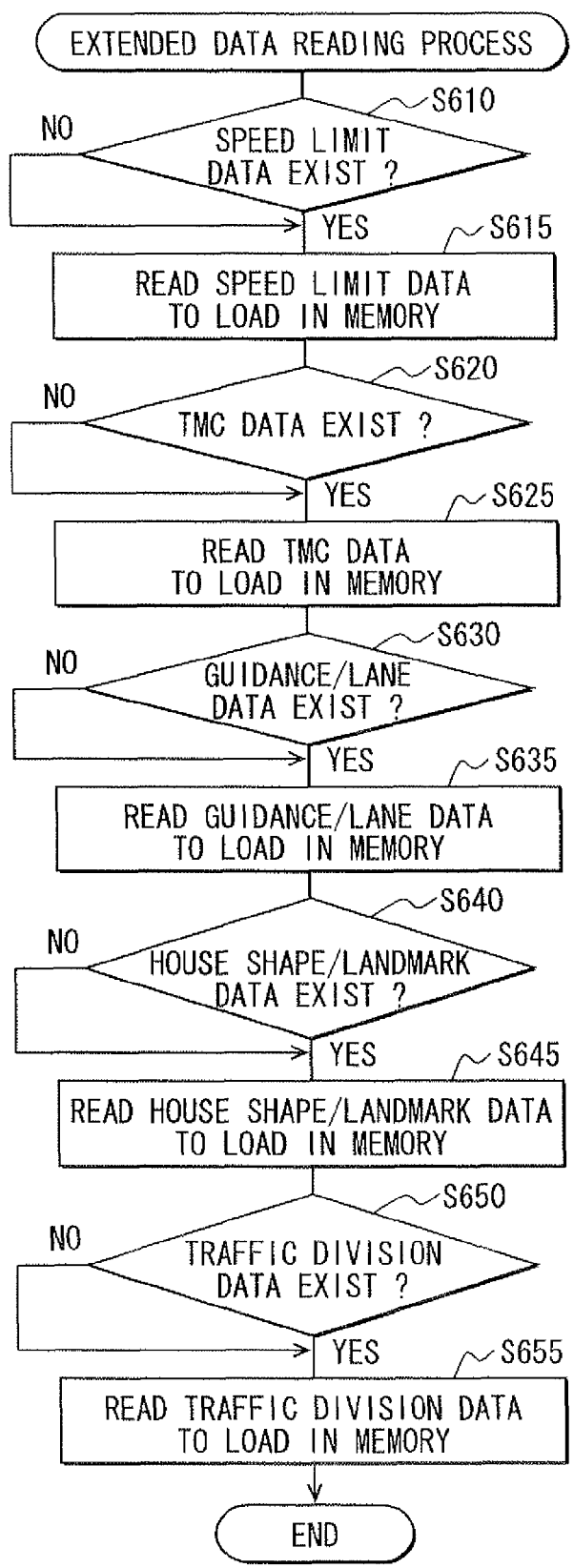
FIGS. 19A and 19B are flowcharts of an extended data reading process and an associated process in the embodiment.

The extended data reading process that is performed by the control circuit 19 after performing the road data reading process for reading the basic data is explained in the following. FIG. 19A illustrates the extended data reading process performed by the control circuit 19 in a flowchart form. In the extended data reading process, whether various types of the extended data have already been stored in the map data input device 13 is determined first for each of the various extended data types (S610, S620, S630, S640, S650). If the extended data is already stored in the map data input device 13, each of the data is read from the device 13 to be stored in the RAM 19c (S615, S625, S635, S645, S655). The extended data reading process is performed for each of the data meshes in the map data.

More practically, the process in FIG. 19A determines whether the speed limit data is memorized as the extended data (S610), whether the TMC data is memorized as the extended data (S620), whether the guidance/lane data is memorized as the extended data (S630), whether the house shape/landmark data is memorized as the extended data (S640), and whether the traffic division data is memorized as the extended data (S650), respectively, in the map data input device 13. In case that the data is memorized in each of the above determinations, the memorized data is loaded in the RAM 19c (S615, S625, S635, S645, S655) for subsequent process.

Figure 19B:
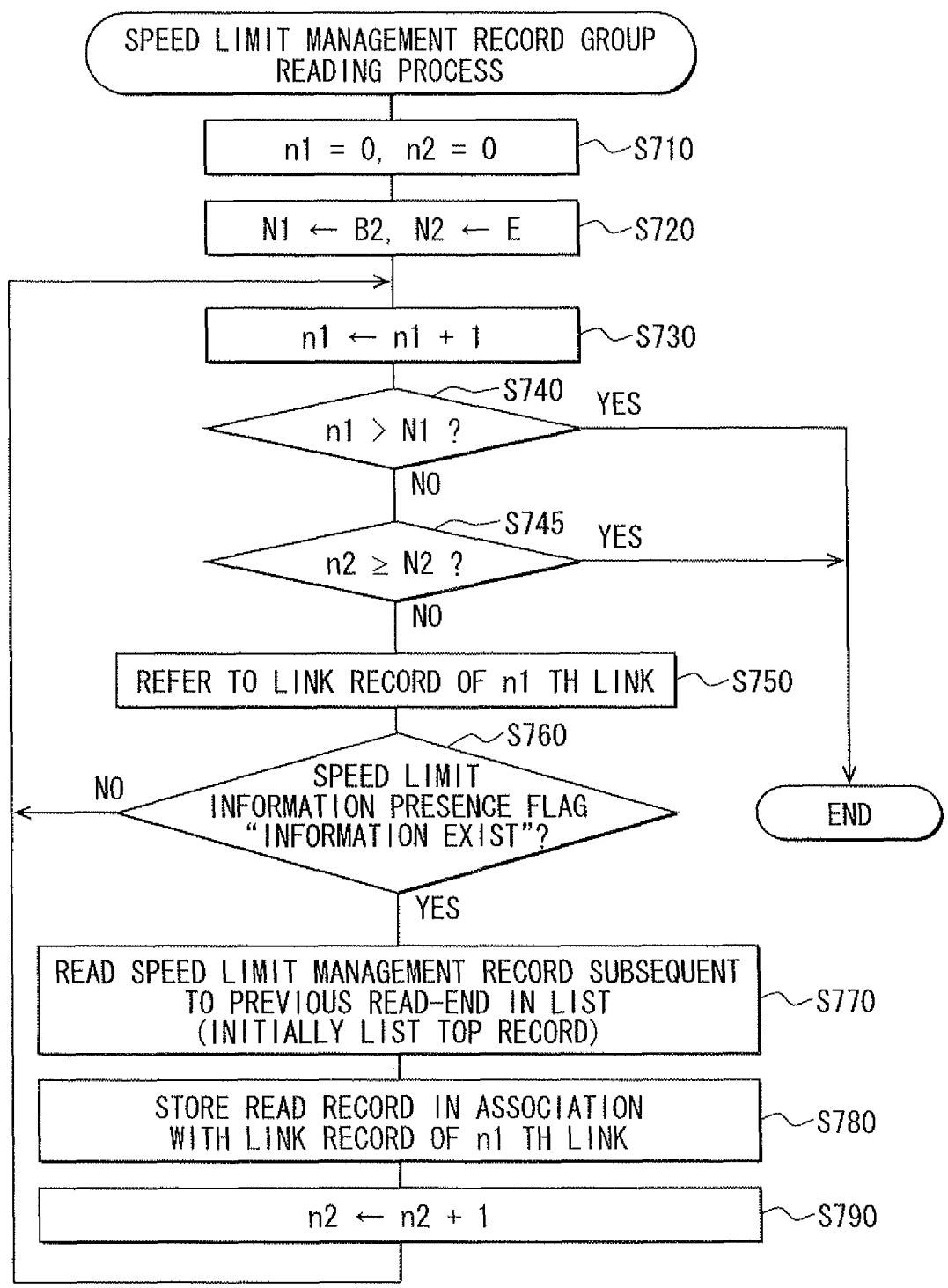

The extended data process is typically read in the following manner. In S615, the speed limit management record group is read by carrying out the speed limit management record group reading process shown in FIG. 19B, for storing the read records in the RAM 19c, in association with the previously read link record group. FIG. 19B illustrates the speed limit management record group reading process performed by the control circuit 19.

When the speed limit management record group reading process is started, the control circuit 19 initializes variables n1, n2 to 0 (zero) (S710), in the same manner as the address range record group reading process, and a number N1 is set as the number B2 of the link records, and a number N2 is set as the number E of the speed limit management records (S720). Then, the process loop of steps S730 to S790 is performed until a condition of n1>N1 is fulfilled (S740, Yes) or unit a condition of n2≥N2 is fulfilled.

The loop of S730 to S790 refers to the link record having the sequence number n1 in an order of n1=1, 2, ..., N (S750), and determines whether the speed limit information presence flag indicates "information exist" or not (S760). If the flag indicates "information exist" (S760, Yes), the process of S770 to S790 reads the speed limit management record and the process returns to the top of the loop S730. If the flag indicates "no information" (S760, No), the process returns to the top of the loop S730 without reading the speed limit management record.

Then, in S770 to S790, the next speed limit management record, which is subsequent to the previous read-end record in the speed limit management list Le, is read from the speed limit management list Le, and the read record is stored in the RAM 19c in association with the link record having the sequence number n1. In this case, in S770 just after the start of the speed limit management record group reading process, the top speed limit management record in the speed limit management list Le is read.

In this manner, the speed limit management record group reading process reads the speed limit management record sequentially from the speed limit management list Le from the top of the list, and associates the read records with the link record which is already loaded in the RAM 19c.

In summary, the navigation apparatus 10 configured and being operated in the above-described manner can easily update, expand and change the contents of the map data in the apparatus 10, due to the advantageous data structure disclosed in the present embodiment.

Although an embodiment of the present disclosure has been fully explained, various modifications and changes are considered to be within the scope of the present disclosure. That is, for example, the data structure of the present embodiment can be used not only in a map data of a vehicular navigation apparatus, but also in a map data of a portable device, such as a cellular phone or the like.

Such changes, modifications, and summarized scheme are to be understood as being within the scope of the present disclosure as defined by appended claims.

What is claimed is:

1. A method of creating map data for representing a map for use in a map data utilization apparatus, the map made up from a plurality of map components and each of the plurality of map components having a plurality of attribute types defined in the map data, each of the attribute types is associated with at least one other attribute type from among the plurality of attribute types, the method comprising:

associating, by a processor, attribute data records of a subject attribute type with attribute data records of an other attribute type by having each of the attribute data records of the other attribute type indicate a number of associated data records from the subject attribute type that respectively correspond with the attribute data record of the other attribute type;

arranging, by the processor, a data list of the attribute data records for the subject attribute type based on (i) a sequential order of the attribute data records of the other attribute type such that the data list for each of the attribute types are aligned to have a same arrangement order as its associated at least one other attribute type for representing the map components of the map data, and (ii) the number of associated data records identified per each of the attribute data records of the other attribute type that respectively correspond with the attribute data record of the other attribute type such that a relationship is established between one attribute data record of the other attribute type and the corresponding attribute data records of the subject attribute type; and storing, by the processor, as the map data for representing the map for use in the map data utilization apparatus, in a form of the data list which is arranged, the attribute data records for each of the plurality of attribute types based on an association between the plurality of attribute types, wherein the attribute data records for representing each of the plurality of attribute types of each of the plurality of map components are formed as one data list.

2. The method of claim 1, wherein
a group of data lists for each of the plurality of attribute types includes an extended data list that belongs to a main data list, the method further comprising:
formulating, by the processor, the extended data list as a data list that lacks attribute data records that are associated with a part of the plurality of map components that are associated with the attribute data records in the main data list; and formulating, by the processor, the main data list as a data list that has an arrangement of attribute data records of each of the plurality of map components in the map, and has embedded identifying information of the attribute data record that is non-existent in the extended data list.

3. The method of claim 2, wherein
the formulating of the main data list embeds a flag in the attribute data record of each of the plurality of map components in the main data list, the flag representing whether a corresponding attribute data record exists in the extended data list.

4. The method of claim 1, further comprising:
formulating, by the processor, a basic data list that is formed as arrangement of basic attributes that are indispensable in the map data as the attribute data records; and formulating, by the processor, an extended data list that is formed as arrangement of extended attributes that are dispensable in the map data as the attribute data records, wherein the map data is created in a plurality of different forms according to inclusion and non-inclusion of the extended data list based on the basic data list.

5. The method of claim 4, wherein
the extended data list formulation procedure formulates the extended data list by appropriately omitting the attribute data records that corresponds to a part of the plurality of map components associated with the attribute data records in the basic data list, and the basic data list formulation procedure embeds, in the basic data list, identifying information that enables identification of the attribute data records omitted from the extended data list.

6. The method of claim 5, wherein
the basic data list formulation procedure embeds, in the attribute data record of each of the plurality of map components in the basic data list, a flag that represents existence of corresponding attribute data records of the component in the extended data list.

7. The method of claim 1, wherein
the map component is a link that represents a road as a unit of the map data, and
the data list is an arrangement of a plurality of attribute data records that represent attributes of a corresponding link.

8. A map data utilization apparatus comprising:
a processor for processing map data; and
a map data input unit for inputting the map data to the processor, wherein
the map data has a plurality of map components for drawing a map,
each of the plurality of map components has a plurality of attributes, which are respectively different, represented by attribute data records,
each of the attributes is associated with at least one other attribute from among the plurality of attributes, such that the attribute data records of a subject attribute is associated with the attribute data records of an other attribute by a number of associated data record provided in each of the attribute data records of the other attribute, the number of associated data record indicates a number of attribute data records from the subject attribute that correspond with the attribute data record of the other attribute,
a data list of the attribute data records for the subject attribute type is arranged based on (i) a sequential order of the attribute data records of the other attribute type such that the data list for each of the attribute types are aligned to have a same arrangement order as its associated at least one other attribute type for representing the map components of the map data, and (ii) the number of associated data records identified per each of the attribute data records of the other attribute type that respectively correspond with the attribute data record of the other attribute type such that a relationship is established between one attribute data record of the other attribute type and the corresponding attribute data records of the subject attribute type; and
the attribute data records for each of the plurality of attribute types based on an association between the plurality of data types is stored, as the map data for representing the map for use in the map data utilization apparatus, in a form of the data list which is arranged;
the attribute data records for each of the plurality of attributes is formulated as the data list, such that the data list of the attribute data record for the subject attribute is arranged based on a sequential order of the attribute data record of the other attribute and based on the number of associated data record identified in each of the attribute data record of the other attribute.

9. The map data utilization apparatus of claim 8, wherein
a group of data lists for each of the attribute data records include a main data list and an extended data list that belongs to the main data list,
arrangement of attribute data records in the extended data list indicates a lack of the attribute data records corresponding to a part of the plurality of map components whose attribute data records are arranged in the main data list, and
the main data list is formed as an arrangement of the attribute data records of the plurality of map components of the map and has embedded information indicating the lack of the attribute data record in the extended data list.

10. The map data utilization apparatus of claim 9, wherein
the embedded information indicative of the lack of the attribute data record in the extended data list is a flag embedded in the main data list.

11. The map data utilization apparatus of claim 8, wherein
the map component is a link that represents a road as a unit of the map data, and
the data list is an arrangement of the plurality of the attribute data records that represent attributes of a corresponding link.

12. The map data utilization apparatus of claim 8, wherein
a group of data lists for each of the attribute data records includes a main data list and an extended data list that belongs to the main data list,
arrangement of the attribute data records in the extended data list indicates a lack of the attribute data record corresponding to a part of the plurality of map components whose attribute data records are arranged in the main data list, and
each of the attribute data records of the plurality of map components in the main data list has an absence indicator indicative of an absence of a corresponding attribute data record in the extended data list.

13. The map data utilization apparatus of claim 12, wherein
the absence indicator of the corresponding attribute data record in the extended data list is a presence flag in the attribute data records of the main data list.

14. The map data utilization apparatus of claim 8, wherein
the data list is categorized either as a main data list or an extended data list that is dependent on the main data list,
the main data list is an arrangement of main attribute data records representative of each of the plurality of map components,
the extended data list is an arrangement of extended attribute data records,
a part of the plurality of map components in the main data list have no extended attribute data records in the extended data list,
each of the plurality of map components in the main data list has extended attribute data record presence information, and
the extended attribute data record presence information is included in the main data list.

15. The map data utilization apparatus of claim 14, wherein
the extended attribute data record presence information is included as a flag in the main data list.

16. The method of claim 1, wherein records in the data list are formatted as a Mesh Unit Data of Road Data.

17. The map data utilization apparatus of claim 8, wherein records in the data list are formatted as a Mesh Unit Data of Road Data.

* * * * *